US011482159B2

(12) United States Patent
Nagao et al.

(10) Patent No.: US 11,482,159 B2
(45) Date of Patent: Oct. 25, 2022

(54) DISPLAY CONTROL DEVICE, DISPLAY CONTROL METHOD, AND DISPLAY CONTROL PROGRAM

(71) Applicant: Sony Group Corporation, Tokyo (JP)

(72) Inventors: Masafumi Nagao, Tokyo (JP); Tomoki Numata, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/419,418

(22) PCT Filed: Mar. 30, 2020

(86) PCT No.: PCT/JP2020/014618
§ 371 (c)(1),
(2) Date: Jun. 29, 2021

(87) PCT Pub. No.: WO2020/217874
PCT Pub. Date: Oct. 29, 2020

(65) Prior Publication Data
US 2022/0076612 A1    Mar. 10, 2022

(30) Foreign Application Priority Data

Apr. 26, 2019 (JP) .............................. JP2019-085344

(51) Int. Cl.
*G09G 3/20* (2006.01)

(52) U.S. Cl.
CPC ..... *G09G 3/2096* (2013.01); *G09G 2340/045* (2013.01); *G09G 2340/0464* (2013.01); *G09G 2340/12* (2013.01); *G09G 2354/00* (2013.01)

(58) Field of Classification Search
None
See application file for complete search history.

(56) References Cited

U.S. PATENT DOCUMENTS

| 11,079,995 B1* | 8/2021 | Hulbert | G06F 3/0485 |
| 2012/0206577 A1* | 8/2012 | Guckenberger | G09B 19/003 |
| | | | 348/47 |
| 2015/0124170 A1* | 5/2015 | Kenmochi | H04N 21/426 |
| | | | 348/564 |

FOREIGN PATENT DOCUMENTS

| JP | 2001-145005 A | | 5/2001 |
| JP | 2001145005 A | * | 5/2001 |
| JP | 2006-267599 A | | 10/2006 |
| JP | 2006267599 A | * | 10/2006 |
| JP | 2007-013926 A | | 1/2007 |

(Continued)

OTHER PUBLICATIONS

International Search Report (PCT/ISA/210), International Application No. PCT/JP2020/014618, dated Jun. 9, 2020.

(Continued)

*Primary Examiner* — Yi Wang
(74) *Attorney, Agent, or Firm* — Michael Best & Friedrich LLP

(57) ABSTRACT

A display control device includes a display control unit configured to control a display unit to output a first image based on a first imaging signal and a second image based on a second imaging signal, the first imaging signal and the second imaging signal being output from an imaging element that outputs the first imaging signal by pixel-thinning for an entire angle of view and outputs the second imaging signal in all of pixels for a partial region in the entire angle of view.

16 Claims, 17 Drawing Sheets

(56) References Cited

FOREIGN PATENT DOCUMENTS

| JP | 2010-226496 A | 10/2010 |
|---|---|---|
| WO | 2014/013979 A1 | 1/2014 |

OTHER PUBLICATIONS

Notification of Transmittal of the International Search Report and the Written Opinion of the International Searching Authority, or the Declaration (PCT/ISA/220), International Application No. PCT/JP2020/014618, dated Jun. 23, 2020.

Written Opinion of the International Search Authority (PCT/ISA/237), International Application No. PCT/JP2020/014618, dated Jun. 23, 2020.

\* cited by examiner

FIG. 2

FIG. 6
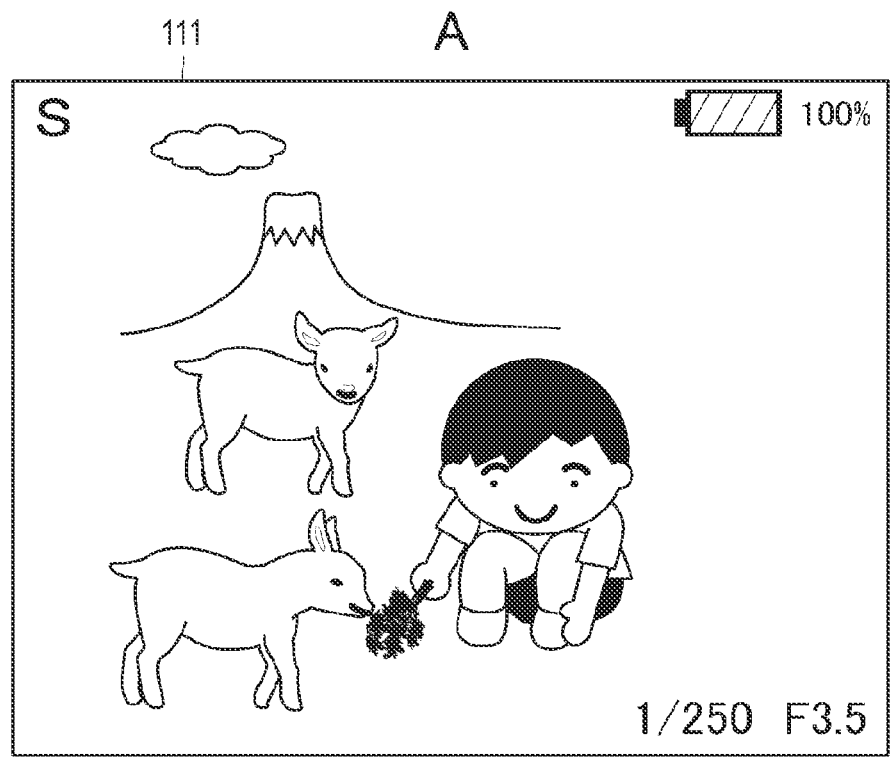
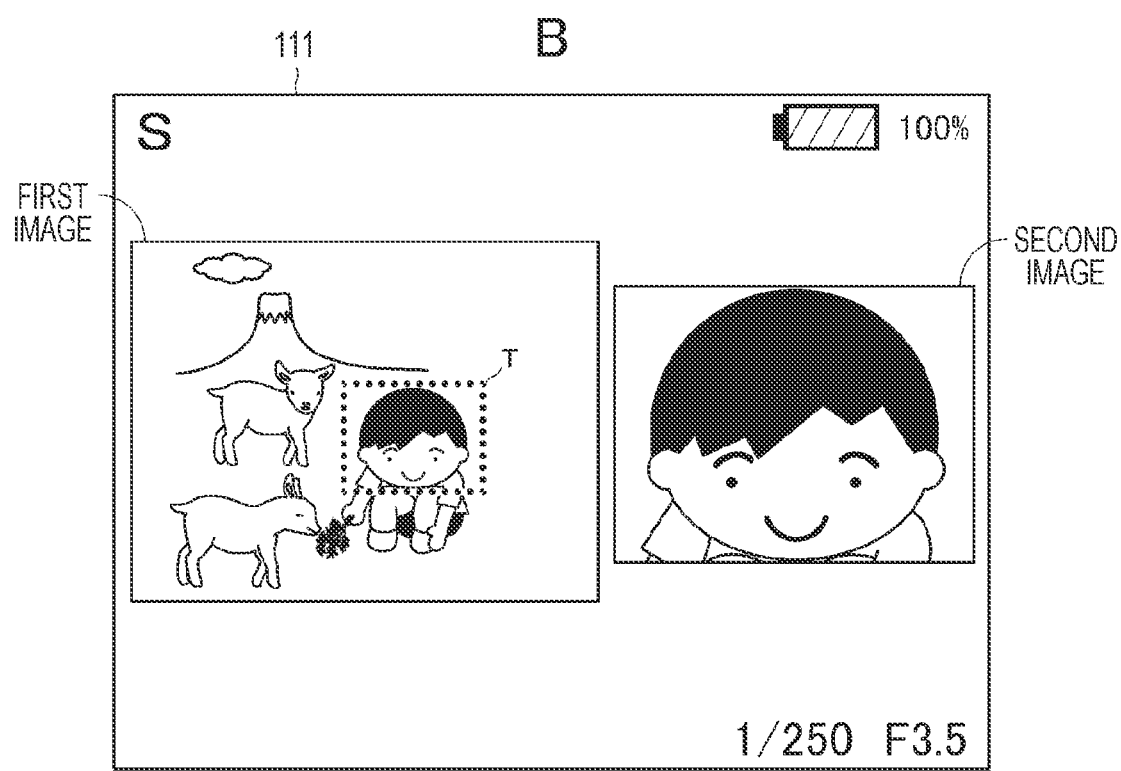

FIG. 11
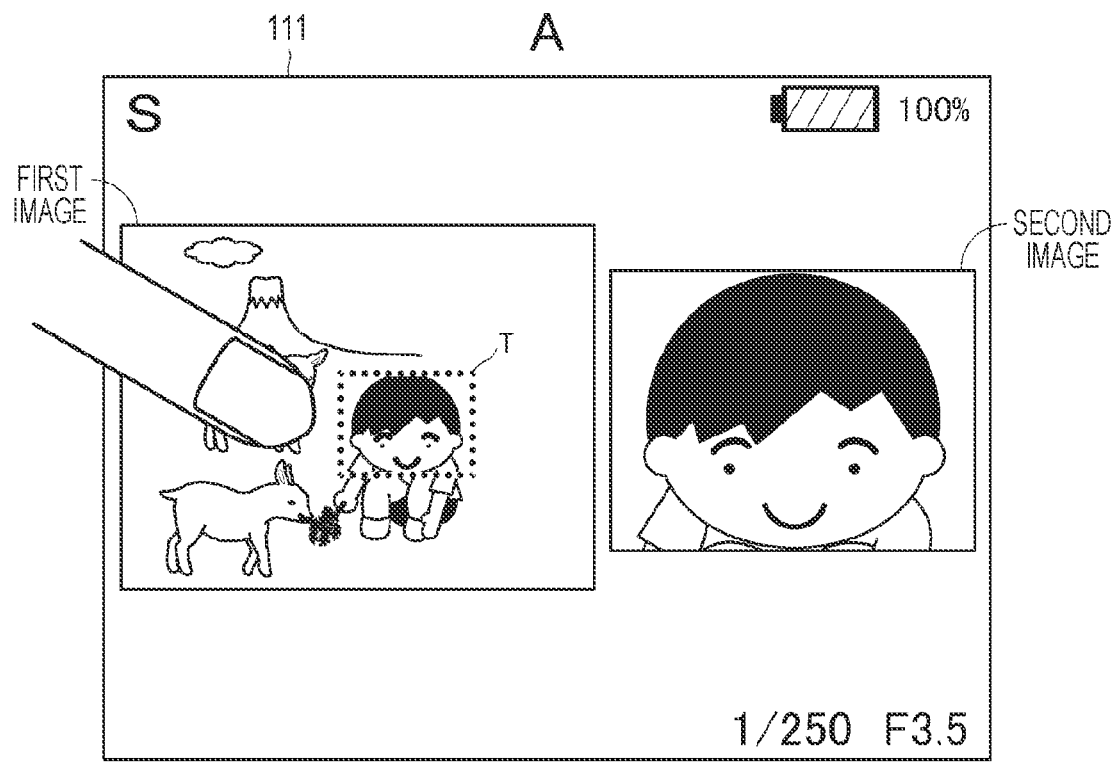
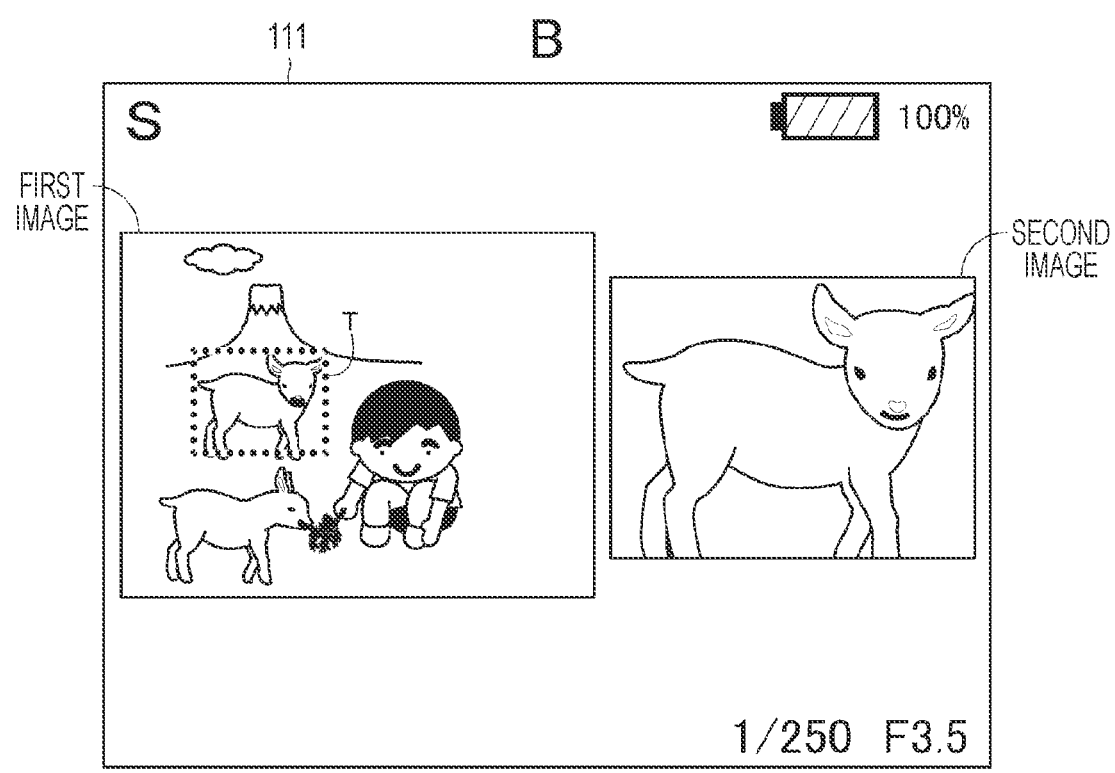

DISPLAY CONTROL DEVICE, DISPLAY CONTROL METHOD, AND DISPLAY CONTROL PROGRAM

TECHNICAL FIELD

The present technology relates to a display control device, a display control method, and a display control program.

BACKGROUND ART

In an imaging device such as a digital camera or a digital video camera, a user captures a still image or a moving image while focusing on a part of an object. For focusing and checking, the user visually checks a monitoring image of the object displayed on a display unit (a back panel, an electronic finder, or the like) provided on the imaging device.

There is a problem that since a display unit of the imaging device has usually a small physical size, it is difficult to check a focus and the object. Therefore, there has been proposed a technique for improving visibility when a user checks a focus state by causing a display unit to enlarge and display a part of an object on a full screen at the time of manual focusing operation (Patent Document 1).

CITATION LIST

Patent Document

Patent Document 1: Japanese Patent Application Laid-Open No. 2007-13926

SUMMARY OF THE INVENTION

Problems to be Solved by the Invention

However, in the technique described in Patent Document 1, when a part of the object is enlarged and displayed on the full screen, only the part of the object is visible and the entire imaging range cannot be grasped. Therefore, there is a problem that the user cannot adjust the composition while adjusting the focus, for example.

The present technology has been made in view of such a problem, and an object thereof is to provide a display control device, a display control method, and a display control program capable of simultaneously checking an entire imaging range and a partial region of the imaging range.

Solutions to Problems

To solve the above-described problem, the first technology is a display control device including a display control unit configured to control a display unit to output a first image based on a first imaging signal and a second image based on a second imaging signal, the first imaging signal and the second imaging signal being output from an imaging element that outputs the first imaging signal by pixel-thinning for an entire angle of view and outputs the second imaging signal in all of pixels for a partial region in the entire angle of view.

Furthermore, the second technology is a display control method including controlling a display unit to output a first image based on a first imaging signal and a second image based on a second imaging signal, the first imaging signal and the second imaging signal being output from an imaging element that outputs the first imaging signal by pixel-thinning for an entire angle of view and outputs the second imaging signal in all of pixels for a partial region in the entire angle of view.

Moreover, the third technology is a display control program for causing a computer to execute a display control method including controlling a display unit to output a first image based on a first imaging signal and a second image based on a second imaging signal, the first imaging signal and the second imaging signal being output from an imaging element that outputs the first imaging signal by pixel-thinning for an entire angle of view and outputs the second imaging signal in all of pixels for a partial region in the entire angle of view.

BRIEF DESCRIPTION OF DRAWINGS

FIG. 2 is explanatory diagrams of imaging signal output from an imaging element 103.

FIG. 6 is explanatory diagrams of a first display mode.

FIG. 11 is explanatory diagrams of an example of changing a display mode according to an input from a user.

MODE FOR CARRYING OUT THE INVENTION

Hereinafter, an embodiment of the present technology will be described with reference to the drawings. Note that the description will be given in the following order.

<1. Embodiment>
[1-1. Configuration of Imaging Device 100]
[1-2-1. First Display Mode]
[1-2-2. Second Display Mode]
[1-2-3. Third Display Mode]
<2. Application>
<3. Application>
<4. Modification>

1. Embodiment

[1-1. Configuration of Imaging Device 100]

Figure 1:
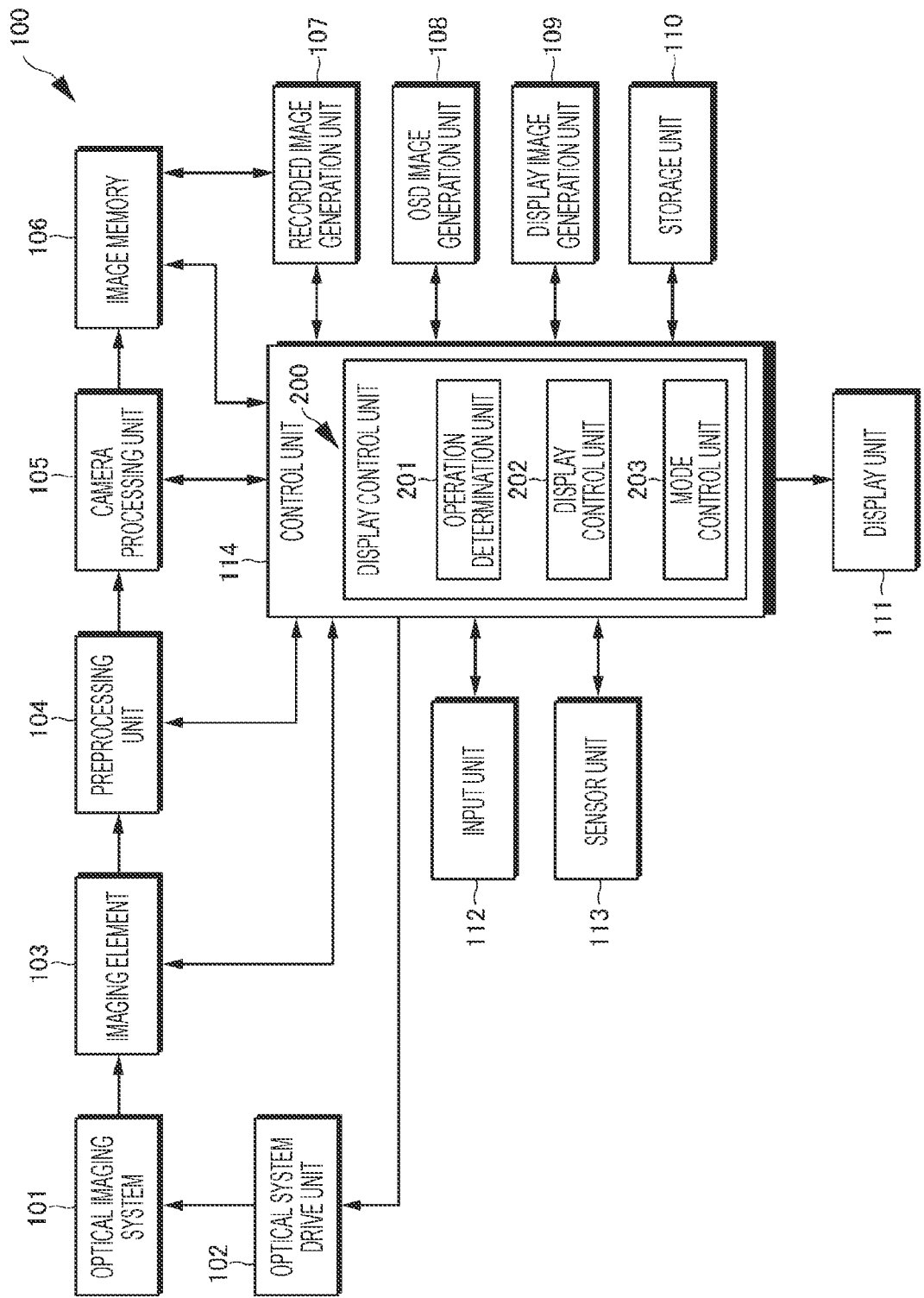
FIG. 1 is a block diagram illustrating a configuration of an imaging device 100 including a display control device 200 according to the present technology.

First, a configuration of an imaging device 100 having a function of a display control device 200 according to the present technology will be described with reference to FIG. 1.

The imaging device 100 includes an optical imaging system 101, an optical system drive unit 102, an imaging element 103, a preprocessing unit 104, a camera processing unit 105, an image memory 106, a recorded image generation unit 107, an OSD image generation unit 108, a display image generation unit 109, a storage unit 110, a display unit 111, an input unit 112, a sensor unit 113, and a control unit 114.

The optical imaging system 101 includes an imaging lens for condensing light from an object on the imaging element 103, a drive mechanism for moving the imaging lens to perform focusing and zooming, a shutter mechanism, an iris mechanism, and the like. These mechanisms are driven under the control of the optical system drive unit 102. An optical image of the object obtained through the optical imaging system 101 is formed on the imaging element 103.

The optical system drive unit 102 includes, for example, a microcomputer, and controls operations of a driving mechanism, a shutter mechanism, an iris mechanism, and the like of the optical imaging system 101 under the control of the control unit 114. As a result, an exposure time (shutter speed), an aperture value (F value), and the like are adjusted.

The imaging element 103 photoelectrically converts incident light from the object into a charge amount and outputs the charge amount as an imaging signal. The imaging signal output from the imaging element 103 is output to the preprocessing unit 104. As the imaging element 103, a charge coupled device (CCD), a complementary metal oxide semiconductor (CMOS), or the like is used.

Figure 2:
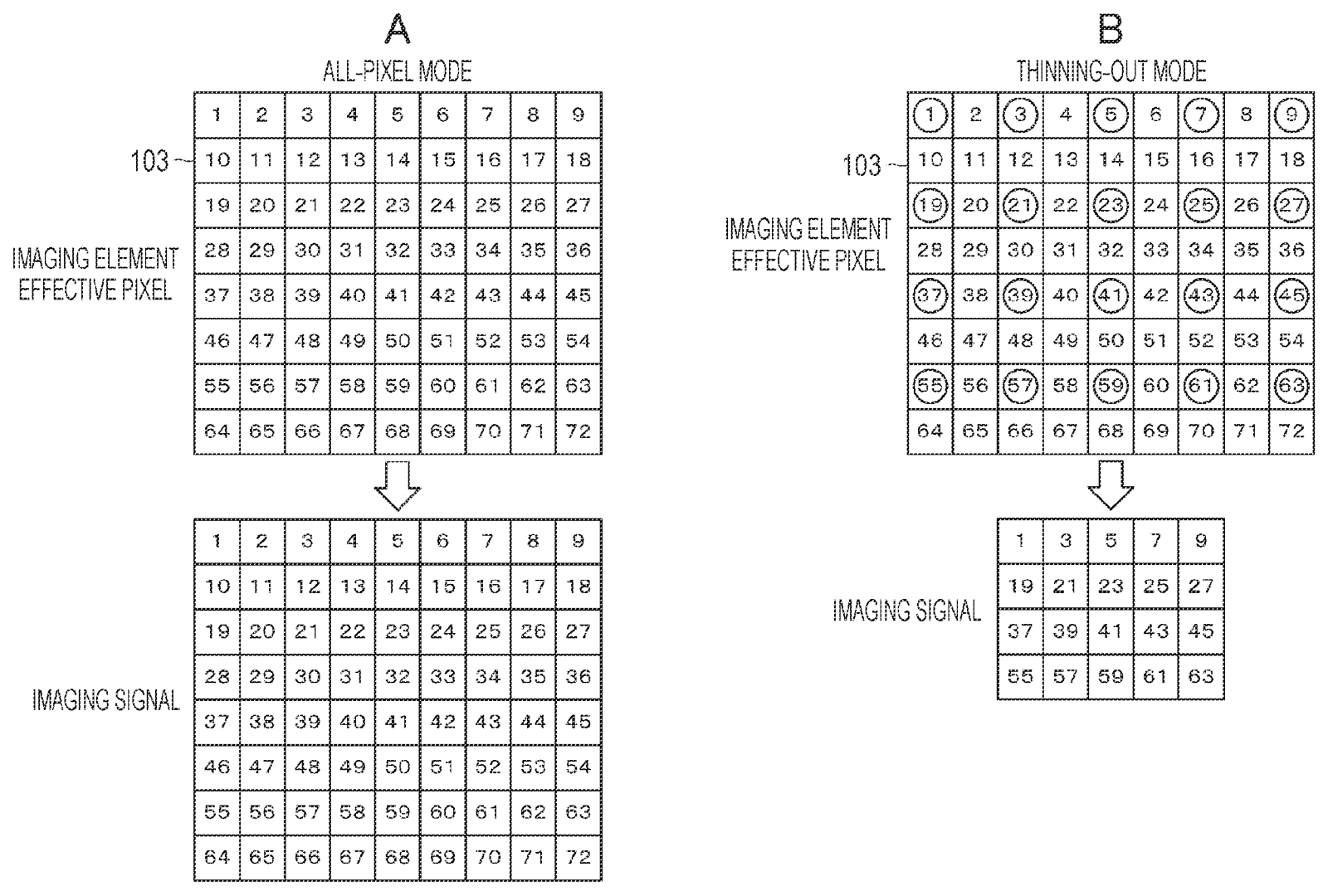

In the present technology, the imaging element 103 can operate in a plurality of readout modes having different resolutions as images. The readout mode includes, as illustrated in FIG. 2A, an all-pixel mode of reading all of effective pixels in an entire angle of view that is the whole of an imaging range and outputting an imaging signal. Furthermore, the readout mode includes, as illustrated in FIG. 2B, a thinning-out mode of thinning out and reading pixels in the entire angle of view that is the whole of the imaging range, and outputting an imaging signal. In FIG. 2B, only the pixels with numbers surrounded by the circles are read among the effective pixels. Note that each number attached to the imaging element 103 in FIGS. 2 and 3 indicates a pixel.

Figure 3:
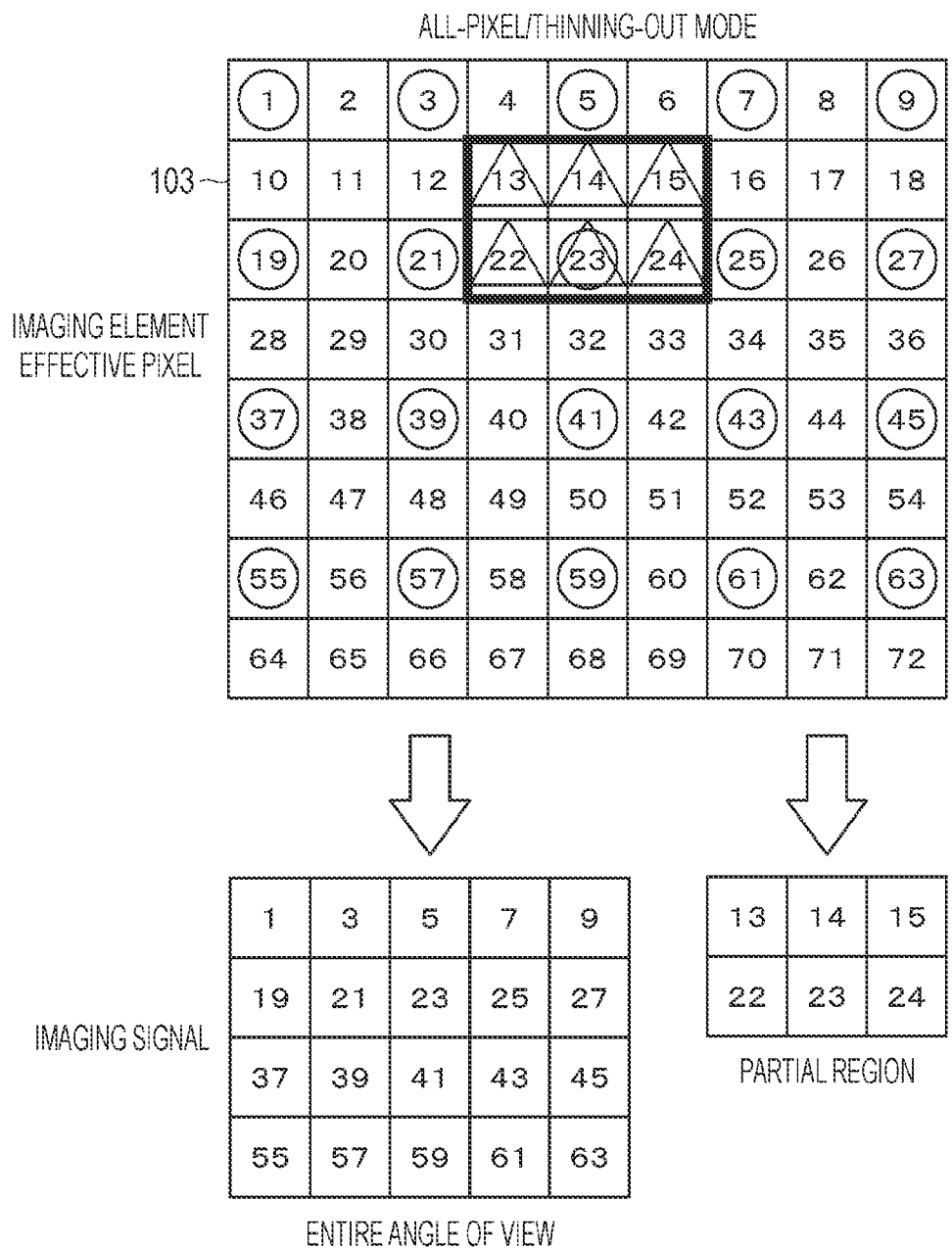
FIG. 3 is an explanatory diagram of imaging signal output from the imaging element 103.

Moreover, as illustrated in FIG. 3, the readout mode includes an all-pixel/thinning-out mode. In the all-pixel/thinning-out mode, pixels are thinned out and read as indicated by the pixels with numbers surrounded by the circles in the entire angle of view that is the whole of the imaging range, and an imaging signal is output. Moreover, in the all-pixel/thinning-out mode, in a partial region surrounded by the thick line within the entire angle of view, all the pixels with numbers surrounded by the triangles are read out, and the imaging signal is output. The readout and output of the imaging signals by the two methods are simultaneously performed within the same exposure. Note that the partial region surrounded by the thick line in FIG. 3 is set for convenience of description, and the partial region is not limited thereto.

The imaging element 103 operates in any of the above-described modes according to the control of a readout mode control unit 203 and outputs the imaging signal. The operation mode of the imaging element 103 can be switched by the control of the mode control unit 203.

The imaging signal reads from the thinned-out pixels and output in the entire angle of view in the all-pixel/thinning-out mode corresponds to a first imaging signal in the claims. Furthermore, the imaging signal reads from all the pixels in the partial region in the entire angle of view and output corresponds to a second imaging signal in the claims. Then, an image based on the first imaging signal is a first image in the claims, and an image based on the second imaging signal is a second image in the claims. The second image is a partially enlarged image of the imaging range. The first image and the second image are frame images constituting a through image (monitoring image). The through image is formed by being updated as needed by the output of the imaging signal from the imaging element 103 for each frame and continuously displayed.

The preprocessing unit 104 converts an analog imaging signal into a digital image signal by analog/digital (A/D) conversion and outputs the digital image signal. In addition, a gain may be controlled by auto gain control (AGC) processing for the imaging signal.

The camera processing unit 105 applies, to an image signal, signal processing such as white balance adjustment processing, color correction processing, gamma correction processing, Y/C conversion processing, and auto exposure (AE) processing.

The image memory 106 is a volatile memory, for example, a buffer memory configured by a dynamic random access memory (DRAM), and temporarily stores image data to which predetermined processing has been applied by a pre-stage circuit.

The recorded image generation unit 107 performs resolution conversion and encoding processing into a recording format (for example, joint photographic experts group (JPEG), MPEG-4, or the like) to generate a recorded image on the basis of the image processed in the camera processing unit 105.

The OSD image generation unit 108 generates an on screen display (OSD) image for notifying a user of camera information such as time, a current exposure mode, an F-number, and a remaining battery level, for example.

The display image generation unit 109 generates an image to be displayed on the display unit 111. For example, the display image generation unit 109 performs synthesis processing for the monitoring image and the OSD image, resolution conversion expansion processing according to the resolution of the display unit 111, and the like.

The storage unit 110 is, for example, a mass storage medium such as a hard disc drive (HDD), a solid state drive (SSD), or an SD memory card. An image is stored in a compressed state on the basis of a standard such as joint photographic experts group (JPEG), for example. Furthermore, exchangeable image file format (EXIF) data including information regarding the stored image and additional information such as capture date and time is also stored in association with the image. A moving image is stored in a format such as moving picture experts group2 (MPEG2) or MPEG4, for example.

The display unit 111 is a display device configured by, for example, a liquid crystal display (LCD), a plasma display panel (PDP), an organic electro luminescence (EL) panel, or the like. The display unit 111 displays a user interface of the imaging device 100, a menu screen, the monitoring image being captured, a captured image recorded in the storage unit 110, a captured moving image, and the like.

The input unit 112 includes, for example, a power button for switching on/off of power, a release button for giving an instruction on start of recording of a captured image, an operator for zoom adjustment, a touch screen integrally configured with the display unit 111, and the like. When an input is made to the input unit 112, a control signal corresponding to the input is generated and output to the control unit 114. Then, the control unit 114 performs arithmetic processing and control corresponding to the control signal.

The sensor unit 113 comprehensively represents various sensors. For example, a gyro sensor (angular velocity sensor), an acceleration sensor, and the like for detecting a camera shake, or the entire movement of the imaging device 100 such as the posture or movement of the imaging device 100 are provided. Furthermore, an illuminance sensor that detects external illuminance for exposure adjustment and the like, and a distance measuring sensor that measures an object distance may be provided.

The control unit 114 is configured by a central processing unit (CPU), a random access memory (RAM), a read only memory (ROM), and the like. The ROM stores a program that are read and operated by the CPU, and the like. The RAM is used as a work memory for the CPU. The CPU executes various types of processing according to the program stored in the ROM and issuing commands to control the entire imaging device 100.

In the present embodiment, the control unit 114 has functional blocks as an operation determination unit 201, a display control unit 202, and a mode control unit 203 constituting the display control device 200.

The operation determination unit 201 detects a current state of the imaging device 100 and determines/judges an operation to be performed next. For example, the operation determination unit 201 detects that the shutter button has been pressed during a still image capture mode and determines execution of still image capture operation. Furthermore, for example, the operation determination unit 201 detects that a predetermined input operation such as manual focus has been performed in the still image capture mode, and determines execution of display control according to the present technology.

For example, when execution of the display control according to the present technology is determined by the operation determination unit 201, the display control unit 202 performs display control to set the display on the display unit 111 to a display mode according to the present technology and causes the display unit 111 to display the first image and the second image in a predetermined mode. Details of the display control according to the present technology will be described below. Furthermore, the display control unit 202 instructs the readout mode control unit 203 to switch appropriate readout mode.

The readout mode control unit 203 controls switching of the above-described readout modes that the imaging element 103 has. Specifically, in the case where the display control according to the present technology is executed, the readout mode control unit 203 switches the mode to the all-pixel/thinning-out mode of thinning out the pixels in the entire angle of view and reading all the pixels in the partial region in the entire angle of view within one exposure at the same time, as illustrated in FIG. 3.

The display control device 200 is configured by a program, and the program may be installed in the imaging device 100 in advance, or may be distributed by download, a storage medium, or the like and installed by the user itself. Note that the display control device 200 may be implemented not only by the program but also by a combination of a dedicated device, a circuit, and the like by hardware having the functions of the program.

The imaging device 100 having the functions as the display control device 200 is configured as described above.

Figure 4:
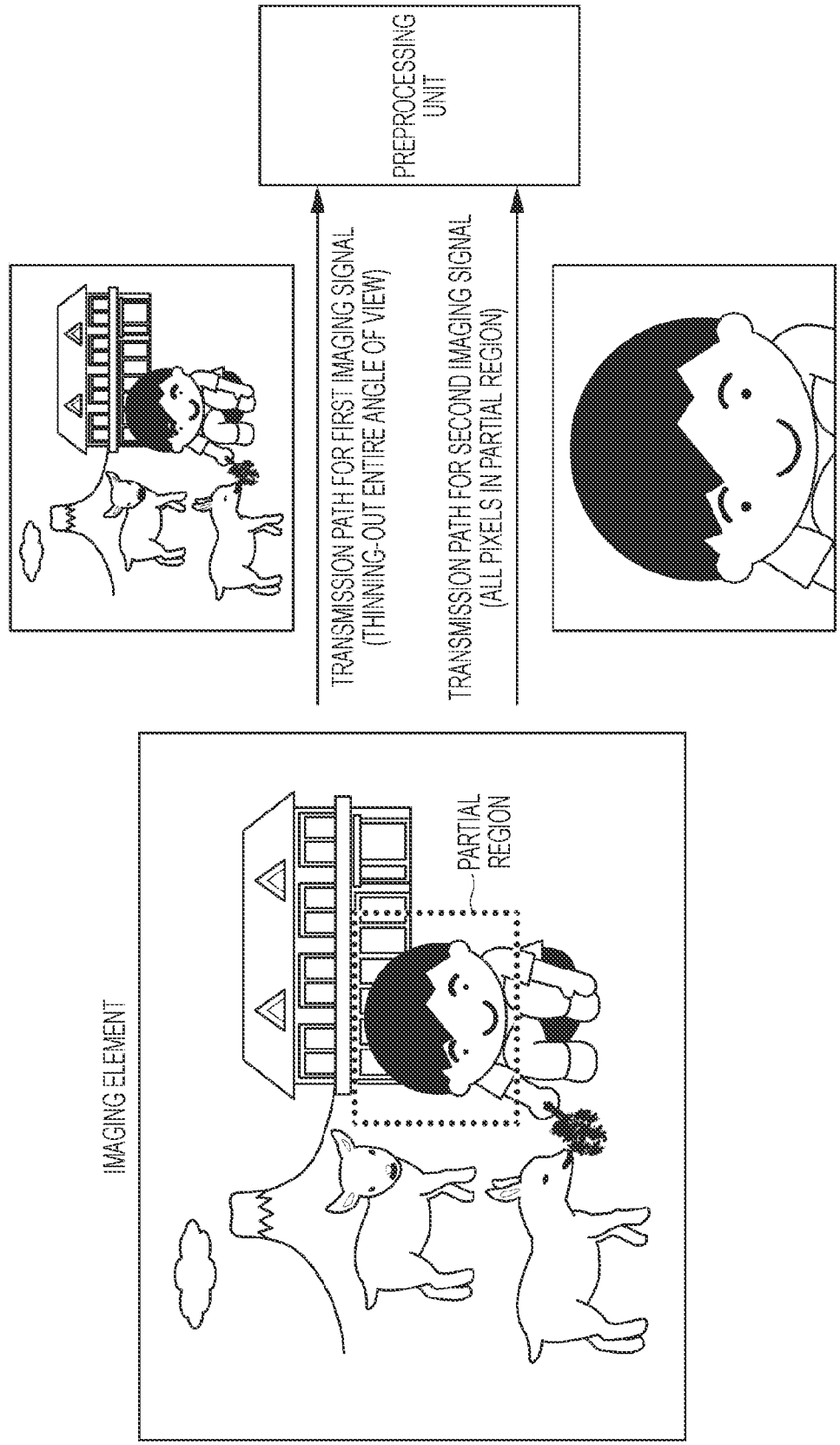
FIG. 4 is an explanatory diagram of an imaging signal output path from the imaging element 103.

In the case where the imaging element 103 is in the all-pixel/thinning-out mode, the first imaging signal read by thinning out and the second imaging signal reads in all the pixels in the partial region are output from the imaging element 103. In this case, as illustrated in FIG. 4, in transmission of the imaging signal from the imaging element 103 to the preprocessing unit 104, a plurality of interfaces for digital signals such as low voltage differential signaling (LVDS) and a mobile industry processor interface (MIPI) is provided, and the interfaces are used as a signal transmission path for the first imaging signal and a signal transmission path for the second imaging signal, respectively.

Note that, in the case where the first imaging signal and the second imaging signal are transmitted through different paths, one imaging signal may be delayed from the other imaging signal. In a case where such a delay occurs, timing information may be added to the first imaging signal and the second imaging signal, and the preprocessing unit 104 may stand by until both the first imaging signal and the second imaging signal having the same timing information arrive and then perform processing after receiving both the signals.

Note that this timing synchronization processing may be performed by a signal reception unit provided between the imaging element 103 and the preprocessing unit 104 in addition to the preprocessing unit 104.

Note that the transmission of the imaging signal from the imaging element 103 may be a wireless path instead of a wired path. Furthermore, the first imaging signal and the second imaging signal may be alternately transmitted through one transmission path as long as a band is sufficiently secured and the processing is in time.

[1-2-1. First Display Mode]

Next, a first display mode by display control of the display control device 200 will be described. Note that the first display mode, and a second display mode and a third display mode to be described below are for displaying a through image on a back display panel or an electronic view finder (EVF) as the display unit 111 when the user performs image capture using the imaging device 100. The user performs image capture by adjusting the angle of view, adjusting the composition, focusing, checking the object, and the like while viewing the display.

Figure 5:
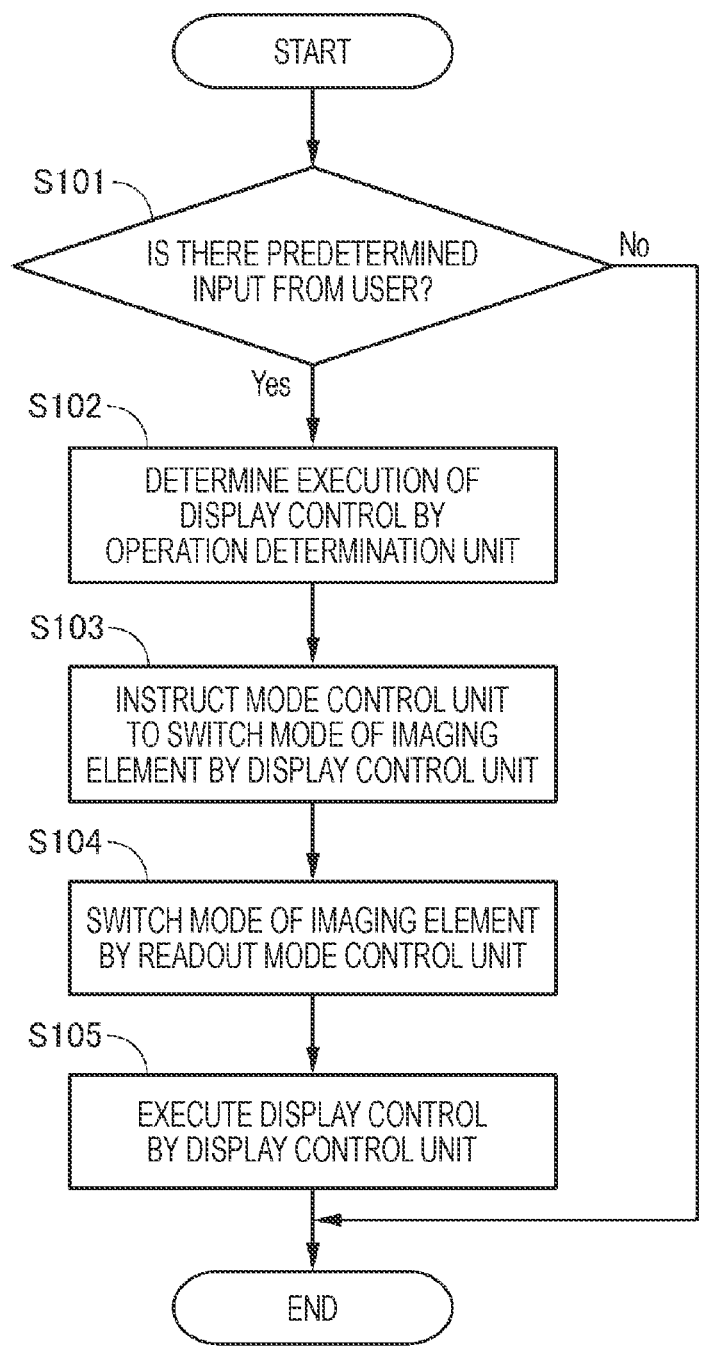
FIG. 5 is a flowchart of processing for implementing a first display mode.

First, in step S101 in the flowchart of FIG. 5, whether or not there is a predetermined input such as manual focus or an input giving an instruction to execute the display control according to the present technology from the user to the imaging device 100 is determined.

In a case where there is the input, the processing proceeds to step S102 (Yes in step S101).

Next, in step S102, the operation determination unit 201 determines execution of the display control according to the present technology. Next, in step S103, the display control unit 202 instructs the readout mode control unit 203 to switch the mode of the imaging element 103.

Next, in step S104, the readout mode control unit 203 transmits the control signal to the imaging element 103 and sets the mode of the imaging element 103 to the all-pixel/thinning-out mode. When the imaging element 103 is set to the all-pixel/thinning-out mode, the first imaging signal and the second imaging signal are supplied from the imaging element 103 to the preprocessing circuit, and the first image and the second image are generated through the above-described image processing.

Then, in step S105, the display control unit 202 controls the display on the display unit 111 to display the first image and the second image.

Here, the first display mode will be described with reference to FIG. 6.

FIG. 6A is a display of a through image in a normal state displayed on the display unit 111. In this state, when the user inputs the instruction to execute the display control, the display is switched as illustrated in FIG. 6B under the control of the display control unit 202.

In the first display mode illustrated in FIG. 6B, both the first image based on the first imaging signal and the second image based on the second imaging signal are simultaneously displayed side by side on the display unit 111. The first image is an image based on the first imaging signal output by pixel-thinning in the entire angle of view, and the second image is an image based on the second imaging signal output in all the pixels in the partial region in the entire angle of view. Therefore, the first image has lower image quality than the second image, and the second image has higher image quality than the first image.

Since the first image is an image based on the first imaging signal output by pixel-thinning in the entire angle of view, the user can check the entire angle of view that is the whole of the imaging range by viewing the first image. As a result, the user can perform the angle of view adjustment, framing, composition adjustment, and the like while viewing the first image.

Furthermore, the second image is an image of the partial region within the entire angle of view, and is a partially enlarged image of the first image. Since the object is enlarged and displayed, details of the object can be visually confirmed. Therefore, the user can perform accurate focus adjustment, check a small object or a complicated object, check a color of the object, and the like while viewing the second image.

Note that the partial region in the first image enlarged in the second image may be arranged at the center of the first image by default, for example, or may be arranged so as to include a specific object (for example, a face of a person) detected by a known object detection function. Furthermore, the position and size of the partial region may be arbitrarily changed by the user.

Since the first image and the second image are displayed side by side on the display unit 111, the user can perform the focus adjustment and object check while viewing the second image at the same time with performing the angle of view adjustment, composition adjustment, and the like while viewing the first image. Moreover, the user can perform the angle of view adjustment and composition adjustment performed while viewing the first image and can perform focus adjustment and object check performed while viewing the second image without switching the display on the display unit 111.

Note that, since the first image is for performing the angle of view adjustment and composition adjustment, there is no problem even if the image quality is lower than that of the second image.

A rectangular icon T representing the region enlarged in the second image is superimposed and displayed on the first image. With the display, the user can easily check where in the first image has been enlarged in the second image.

[1-2-2. Second Display Mode]

Figure 7:
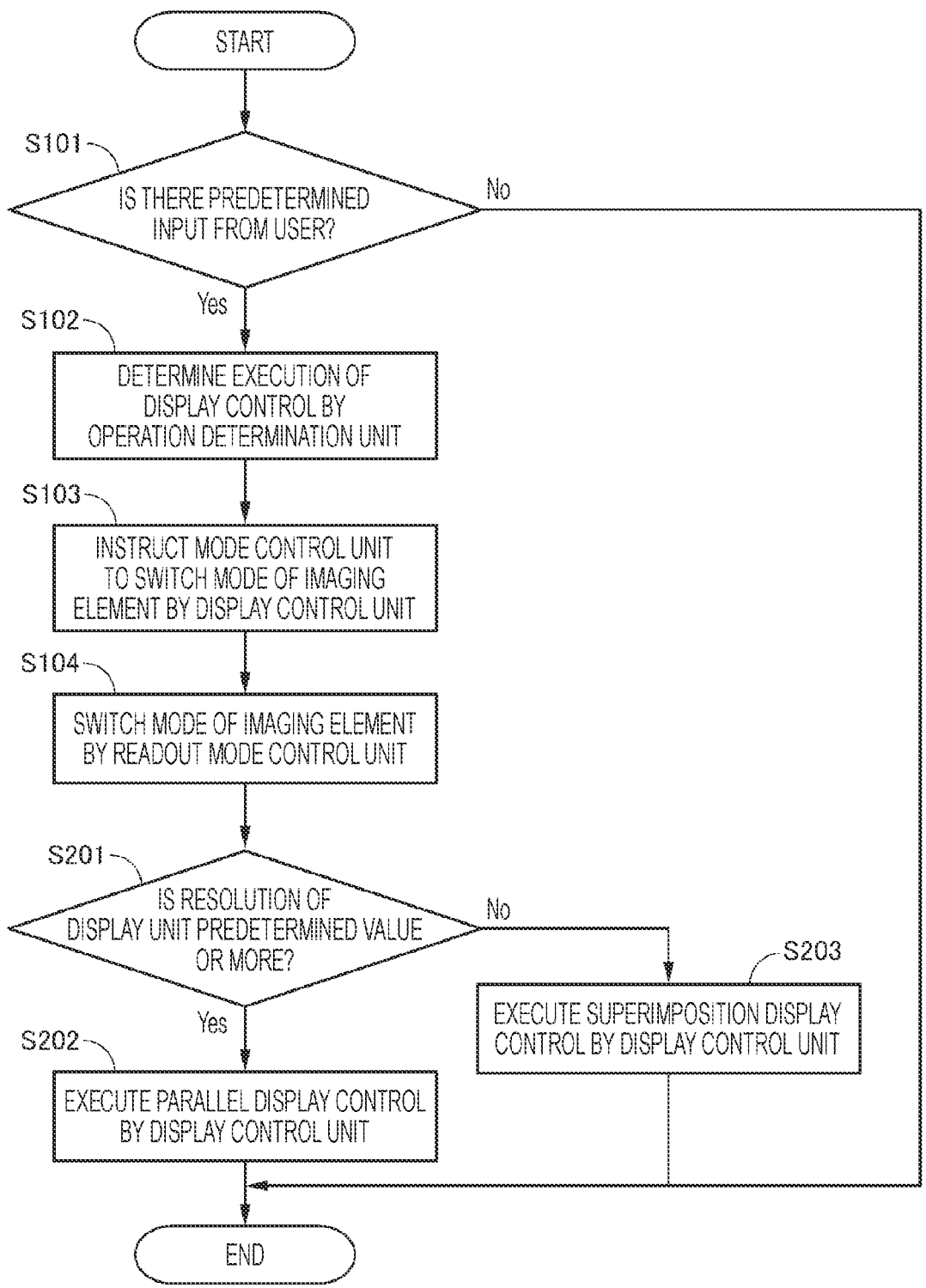
FIG. 7 is a flowchart of processing for implementing a second display mode.

Next, the second display mode by display control of the display control device 200 will be described with reference to FIGS. 7 and 8. Note that, since steps S101 to S104 in the flowchart of FIG. 7 are similar to the processing in FIG. 5, description thereof is omitted.

After step S104, in step S201, whether or not the resolution of the display unit 111 is equal to or greater than a predetermined value is determined. The resolution being equal to or greater than a predetermined value is, for example, whether or not the resolution is equal to or greater than full high definition (FHD).

In a case where the resolution of the display unit 111 is equal to or greater than the predetermined value, the processing proceeds to step S202 (Yes in step S201). Then, in step S202, as illustrated in FIG. 8, the display control unit 202 performs parallel display control similar to the above-described first display mode of simultaneously displaying the first image and the second image side by side.

On the other hand, in a case where the resolution of the display unit 111 is not equal to or greater than the predetermined value, the processing proceeds to step S203 (No in step S201). Then, in step S203, the display control unit 202 performs superimposition display control of superimposing and displaying the second image on the first image, as illustrated in FIG. 8.

Figure 8:
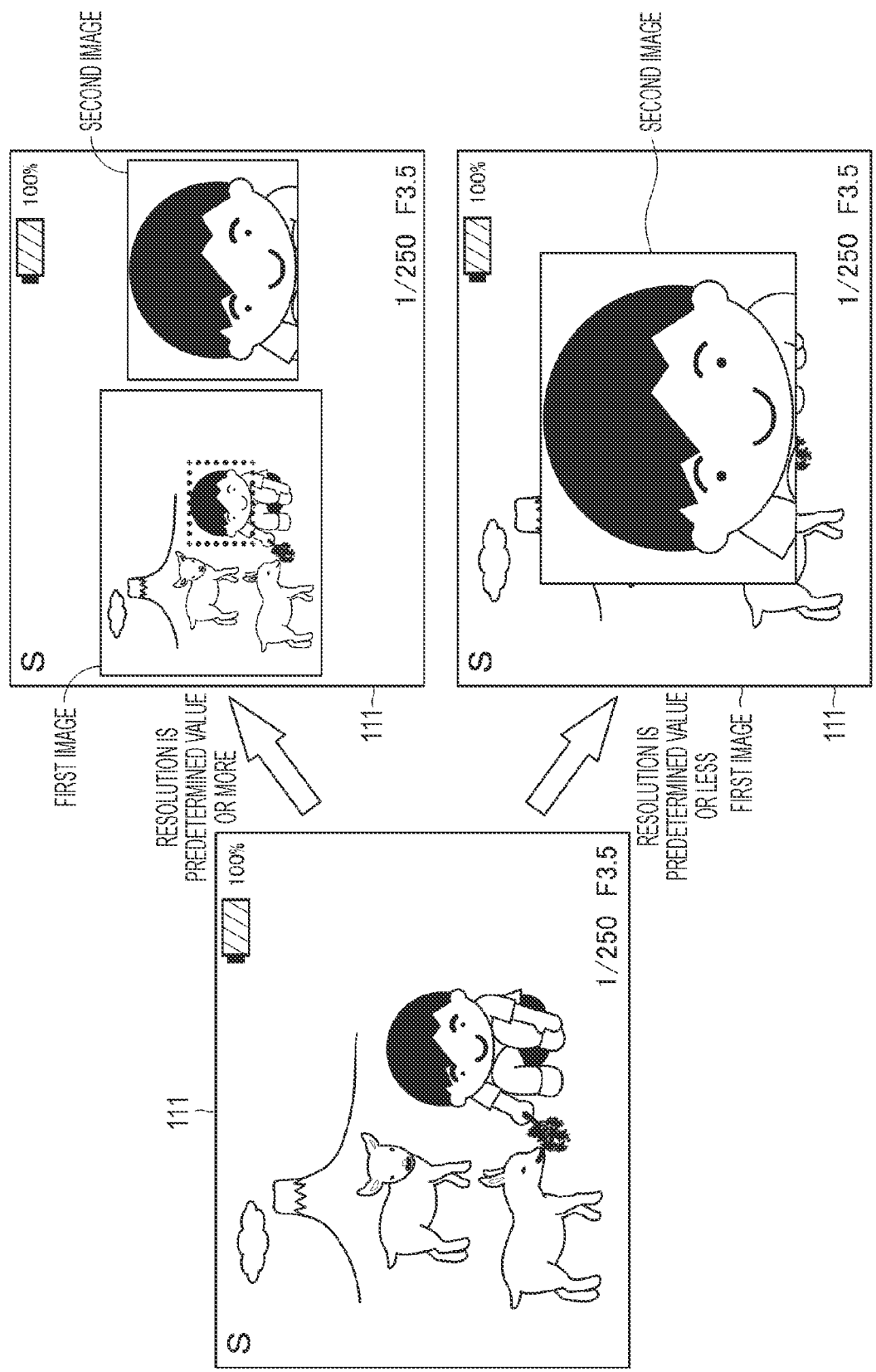
FIG. 8 is an explanatory diagram of the second display mode.

In the mode illustrated in FIG. 8 of superimposing and displaying the second image on the first image, the first image based on the first imaging signal output by pixel-thinning in the entire angle of view is displayed larger than the second image on the entire display unit 111. Furthermore, the second image based on the second imaging signal output in all the pixels in the partial region in the entire angle of view is superimposed and displayed on the first image. In this case, the second image is displayed larger in size than the second image in the state displayed in the first display mode illustrated in FIG. 6. This is because the superimposition display illustrated in FIG. 8 is performed in the case where the resolution of the display unit 111 is low, and to present the second image as a partially enlarged image to the user in an easily viewable manner, it is good to display the second image in a large size. This is also because the size of the second image can be increased in a range not covering the entire first image by the superimposing display.

Since the first image is an image based on the first imaging signal output by pixel-thinning in the entire angle of view, the user can check the entire angle of view by viewing the first image. As a result, the user can perform the angle of view adjustment, composition adjustment, and the like while viewing the first image. Note that, in the case of superimposition display, a part of the first image is hidden by the second image, but in the superimposition display illustrated in FIG. 8, the upper, lower, right, and left ends of the first image are displayed, so adjustment of setting a specific object within the angle of view and adjustment of rough composition can be performed without a problem.

Furthermore, since the second image is an image obtained by enlarging the partial region within the entire angle of view, details of the object can be visually checked, and the user can perform more accurate focus adjustment, object check, and the like while viewing the second image.

As described above, in the second display mode, the display mode is switched according to the resolution of the display unit 111. For example, in a case where the display unit 111 has a high resolution such as FHD (1920×1080) or more, the user can check the object even if the two images are reduced in size and simultaneously displayed side by side as illustrated in FIG. 8.

However, in a case where the display unit 111 has a low resolution, it becomes difficult to view the two images if the two images are reduced in size and simultaneously displayed side by side, similarly to the case of the high resolution. Therefore, in the case of the low resolution, the second image, which is the enlarged image, is preferentially superimposed and displayed on the first image. As a result, even with the low resolution, the user can perform accurate focusing, object check, and the like by viewing the second image.

Note that, in the case of the imaging device 100 having the EVF and the back display panel, the EVF usually has a higher resolution than the back display panel. The first image and the second image may be displayed side by side in the EVF, and the second image may be superimposed and displayed on the first image in the back display panel.

[1-2-3. Third Display Mode]

Figure 9:
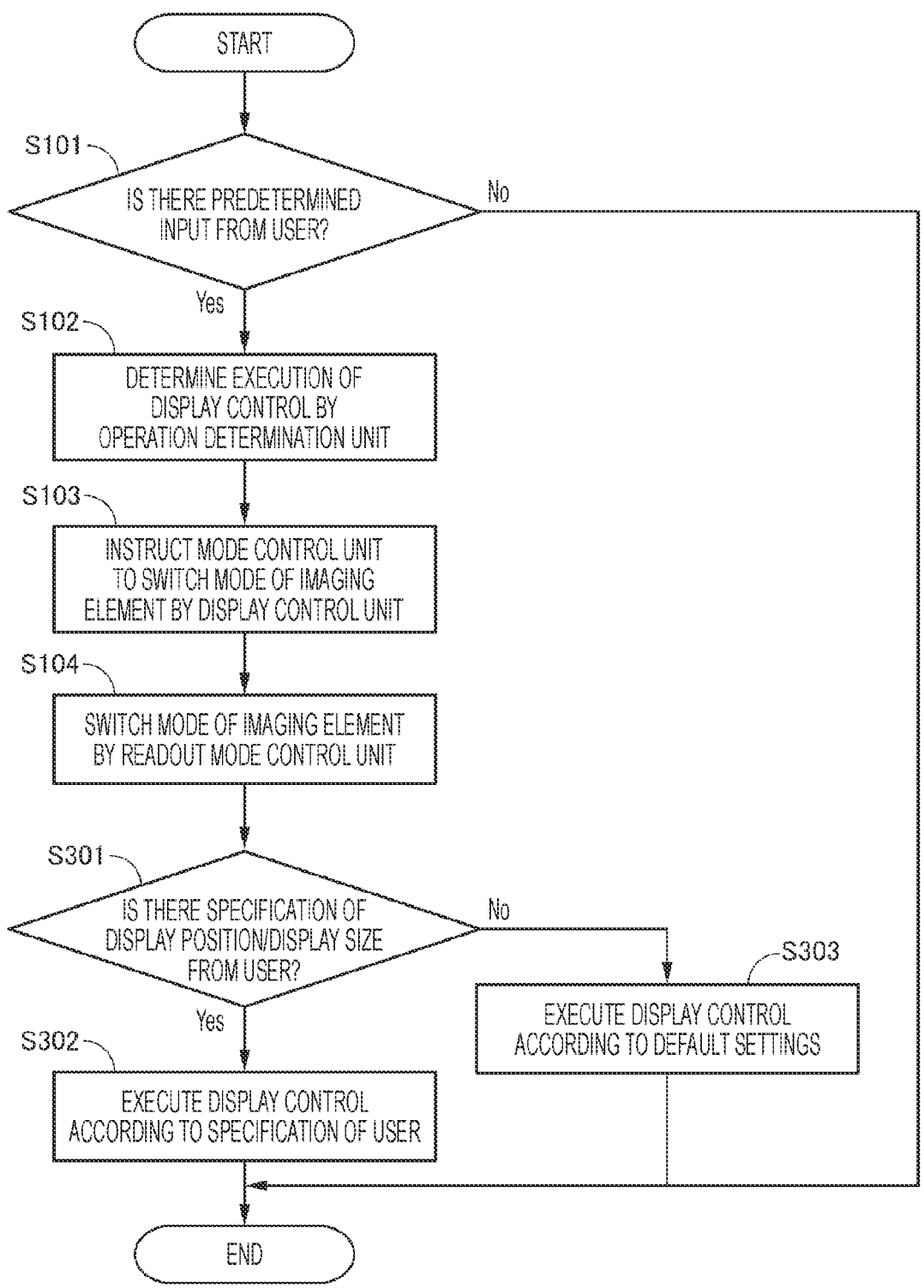
FIG. 9 is a flowchart of processing for implementing a third display mode.
Figure 10:
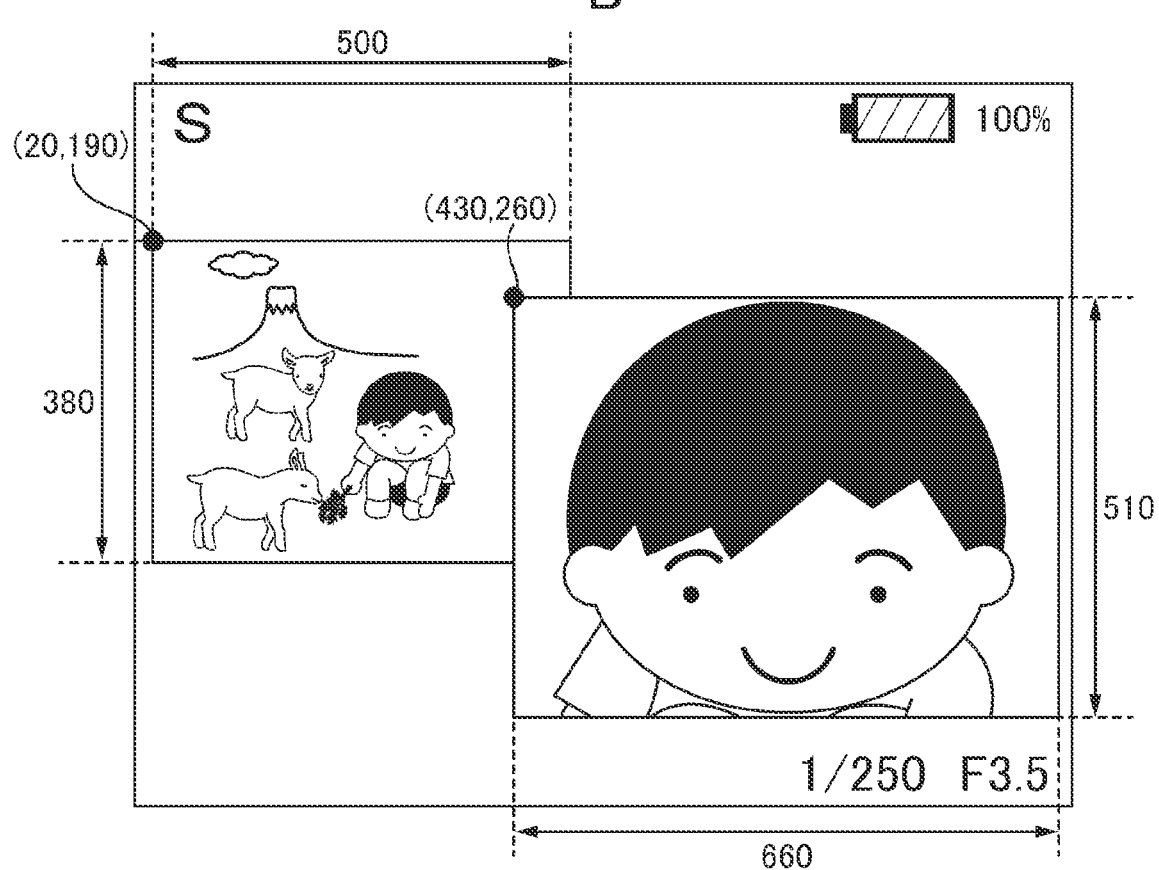
FIG. 10 is explanatory diagrams of the third display mode.

Next, the third display mode by display control of the display control device 200 will be described with reference to FIGS. 9 and 10. Note that, since steps S101 to S104 in the flowchart of FIG. 9 are similar to the processing in FIG. 5, description thereof is omitted.

After step S104, in step S301, whether or not there is an input to specify the display positions and/or the display sizes of the first image and/or the second image from the user is determined. In the case where there is the input from the user, the processing proceeds to step 302 (Yes in step S301).

The input to specify the display positions and/or display sizes from the user is performed by inputting specific values of offset, width, and height as illustrated in FIG. 10A, for example. Furthermore, the user may set the offset, width, and height by operating rectangular icons representing the display positions and display sizes of the first image and the second image by drag operation, pinch-in/pinch-out operation, or the like on the display unit 111. The size and position information are stored in the display control device 200 in such a data configuration.

Then, in step S302, the display control unit 202 causes the display unit 111 to display the first image and the second image in accordance with the input from the user.

On the other hand, in a case where there is no input to specify the display positions and/or display sizes from the user in step S301, the processing proceeds to step S303 (No in step S301), and the first image and the second image are displayed on the display unit 111 with default settings set in advance in the display control device.

FIG. 10B illustrates a display example on the display unit 111 according to the specification of the display positions and/or display sizes from the user. As illustrated in FIG. 10B, the user can freely specify and change the display positions and/or display sizes of the first image and the second image on the screen or from a menu.

The offset indicates two-dimensional coordinates as a reference of the display position of each image. The reference position is, for example, an upper left corner of the image. The width indicates the size of each image in a horizontal direction, and the height indicates the size of each image in a vertical direction. Note that, although the values are in units of pixels in the example of FIG. 10, the values may be stored as normalized values and calculated from the resolution of the display device at the time of display.

Note that the first image and the second image may partially overlap depending on the display positions and display sizes specified by the user. In such a case, the first image and the second image may be superimposed and displayed as illustrated in FIG. 10B, or a restriction may be provided so that the settings of the offset, width, and height can be set within a range where the first image and the second image do not overlap.

As an example of changing the display of the first image and the second image according to the input from the user, there is also an example of changing a region in the first image, the region being enlarged and displayed in the second image according to the input from the user as illustrated in FIG. 11.

In a case where the display unit 111 is a touch screen integrally configured with the input unit 112, as illustrated in FIG. 11A, when the user brings its finger into contact with an arbitrary position in the second image (tap operation), information indicating a predetermined range based on the contact position is supplied from the display control device 200 to the imaging element 103. The imaging element 103 that has received the range information changes the partial region within the entire angle of view for outputting the second imaging signal to the range indicated by the range information, and supplies the second imaging signal output from all the pixels in the partial region to the preprocessing unit 104.

Then, the second image generated from the second imaging signal output from the changed partial region is displayed on the display unit 111, so that an enlarging range of the second image can be changed according to the input from the user as illustrated in FIG. 11B. In the example of FIG. 11, an animal is enlarged and displayed as the second image as the user brings its finger into contact with the position of the animal as the object.

In the case of changing the position of the partial region in the first image, the partial region being enlarged and displayed in the second image in this manner, the display control device 200 also changes the position of the rectangular icon T representing the position of the partial region on the first image.

Note that the range of the second image may be changed according to another operation such as a pinch-in/pinch-out operation instead of the tap operation.

Furthermore, the first image and the second image may be superimposed and displayed depending on the offset, width, and height to be set.

The processing in the present technology is performed as described above. According to the present technology, since the entire image from which the entire angle of view can be checked and the partially enlarged image from which a part can be enlarged and checked are simultaneously displayed, the angle of view adjustment and composition adjustment of the entire captured image, and focus adjustment and detailed check of the object can be performed at the same time, and the usability of the user is improved.

Since the second image as the partially enlarged image has high image quality based on the imaging signal that is not thinned out, the focus state and the object can be easily checked, and the usability for the user is improved.

Furthermore, since the first image that is the entire image is read by thinning out and the second image that is the partially enlarged image is read from all the pixels, the power consumption in the imaging element 103 is substantially the same as that of a conventional normal imaging element 103, and thus the efficiency is not impaired.

Furthermore, since an optimum screen configuration is automatically obtained according to the resolution of the display unit 111, the usability of the user in the focus adjustment and object check is improved.

Furthermore, since the position to be partially enlarged can be changed by a small number of input operations, the usability of the user in the focus adjustment and object check is improved.

Moreover, since the user can freely set the positions/sizes of the entire image from which the entire angle of view can be checked and the partially enlarged image, a screen configuration suitable for each user is obtained, and the usability of the user is improved.

2. Application

The technology according to the present disclosure can be applied to various products. For example, the technology according to the present disclosure may be applied to an operating room system.

Figure 12:
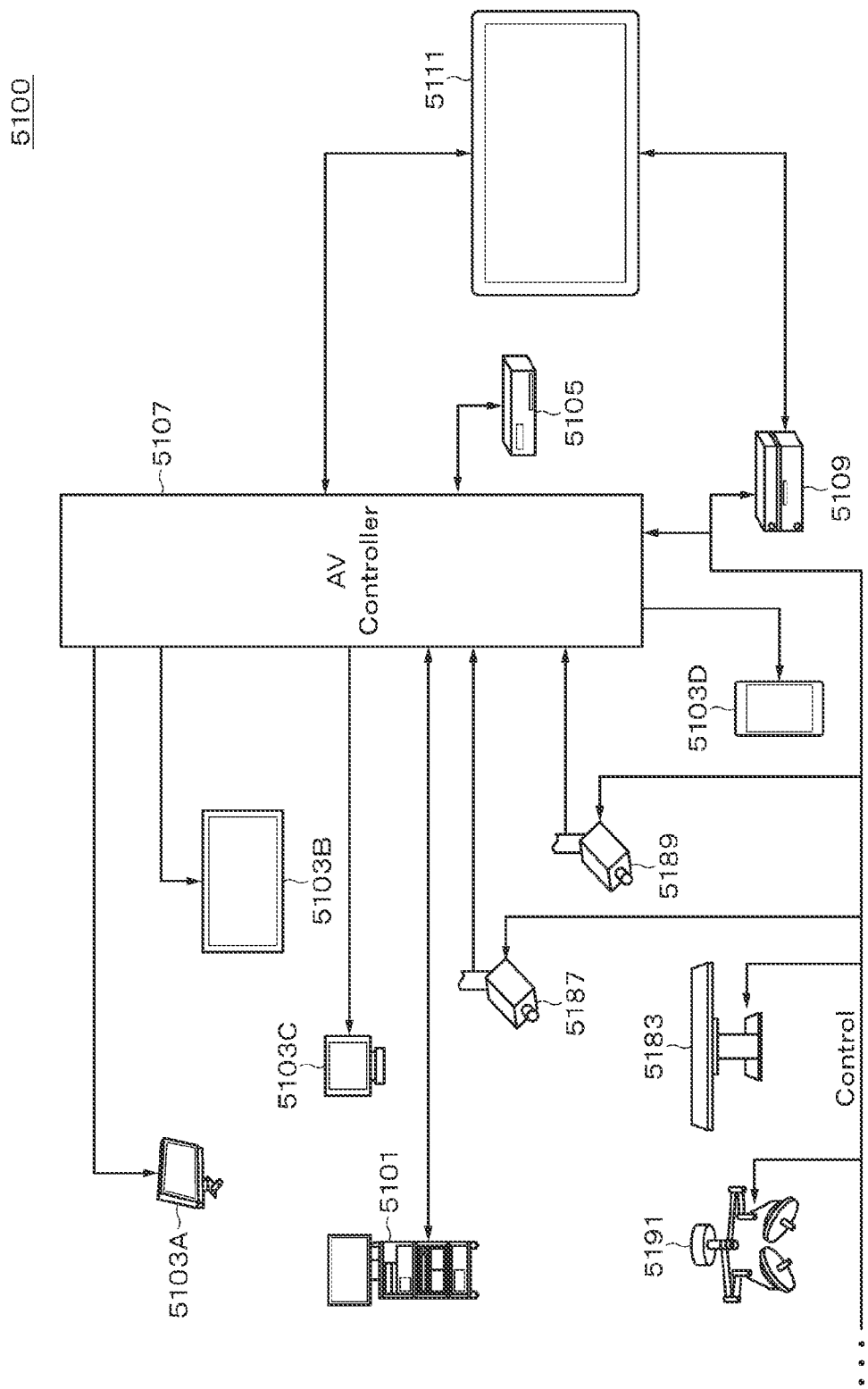
FIG. 12 is a diagram schematically illustrating an overall configuration of an operating room system.

FIG. 12 is a diagram schematically illustrating an overall configuration of an operating room system 5100 to which the technology according to the present disclosure is applicable. Referring to FIG. 12, the operating room system 5100 is configured such that devices installed in an operating room are connected to be able to cooperate with each other via an audiovisual controller (AV controller) 5107 and an operating room control device 5109.

Various devices can be installed in the operating room. FIG. 12 illustrates, as an example, a group of various devices 5101 for endoscopic surgery, a ceiling camera 5187 provided on a ceiling of the operating room and imaging the hand of an operator, a surgical field camera 5189 provided on the ceiling of the operating room and imaging an entire state of the operating room, a plurality of display devices 5103A to 5103D, a recorder 5105, a patient bed 5183, and an illumination 5191.

Here, among these devices, the group of devices 5101 belongs to an endoscopic surgical system 5113 described below and includes an endoscope, a display device that displays an image imaged by the endoscope, and the like. Each device belonging to the endoscopic surgical system 5113 is also referred to as a medical device. Meanwhile, the display devices 5103A to 5103D, the recorder 5105, the patient bed 5183, and the illumination 5191 are devices provided in, for example, the operating room separately from the endoscopic surgical system 5113. Each device not belonging to the endoscopic surgical system 5113 is referred to as a non-medical device. The audiovisual controller 5107 and/or the operating room control device 5109 controls the medical devices and the non-medical devices in cooperation with each other.

The audiovisual controller 5107 centrally controls processing relating to image display in the medical devices and the non-medical devices. Specifically, among the devices included in the operating room system 5100, the group of devices 5101, the ceiling camera 5187, and the surgical field camera 5189 can be devices (hereinafter, also referred to as devices at the transmission source) having a function to transmit information to be displayed during a surgical operation (hereinafter the information is also referred to as display information). Furthermore, the display devices 5103A to 5103D can be devices (hereinafter, also referred to as devices at the output destination) to which the display information is output. Furthermore, the recorder 5105 can be a device corresponding to both the device at the transmission source and the device at the output destination. The audiovisual controller 5107 has functions to control the operation of the devices at the transmission source and the devices at the output destination, acquire the display information from the devices at the transmission source, transmit the display information to the devices at the output destination, and display or record the display information. Note that the display information is various images imaged during the surgical operation, various types of information regarding the surgical operation (for example, physical information of a patient, information of a past examination result, information of an operation method, and the like), and the like.

Specifically, information regarding an image of an operation site in a patient's body cavity imaged by the endoscope can be transmitted from the group of devices 5101 to the audiovisual controller 5107 as the display information. Furthermore, information regarding an image of the operator's hand imaged by the ceiling camera 5187 can be transmitted from the ceiling camera 5187 as the display information. Furthermore, information regarding an image illustrating the state of the entire operating room imaged by the surgical field camera 5189 can be transmitted from the surgical field camera 5189 as the display information. Note that, in a case where another device having an imaging function exists in the operating room system 5100, the audiovisual controller 5107 may acquire information regarding an image imaged by the another device from the another device as the display information.

Alternatively, for example, information regarding these images imaged in the past is recorded in the recorder 5105 by the audiovisual controller 5107. The audiovisual controller 5107 can acquire the information regarding the images imaged in the past from the recorder 5105 as the display information. Note that the recorder 5105 may also record various types of information regarding the surgical operation in advance.

The audiovisual controller 5107 causes at least any of the display devices 5103A to 5103D as the devices at the output destination to display the acquired display information (in other words, the image imaged during the surgical operation and the various types of information regarding the surgical operation). In the illustrated example, the display device 5103A is a display device suspended and installed from the ceiling of the operating room, the display device 5103B is a display device installed on a wall of the operating room, the display device 5103C is a display device installed on a desk in the operating room, and the display device 5103D is a mobile device (for example, a tablet personal computer (PC)) having a display function.

Furthermore, although illustration is omitted in FIG. 12, the operating room system 5100 may include a device outside the operating room. The device outside the operating room can be, for example, a server connected to a network built inside or outside a hospital, a PC used by a medical staff, a projector installed in a conference room of the hospital, or the like. In a case where such an external device is outside the hospital, the audiovisual controller 5107 can also cause a display device of another hospital to display the display information via a video conference system or the like for remote medical care.

The operating room control device 5109 centrally controls processing other than the processing regarding the image display in the non-medical devices. For example, the operating room control device 5109 controls the driving of the patient bed 5183, the ceiling camera 5187, the surgical field camera 5189, and the illumination 5191.

The operating room system 5100 is provided with a centralized operation panel 5111, and the user can give an instruction regarding the image display to the audiovisual controller 5107 and can give an instruction regarding the operation of the non-medical devices to the operating room control device 5109, through the centralized operation panel 5111. The centralized operation panel 5111 is provided with a touch panel on a display surface of the display device.

Figure 13:
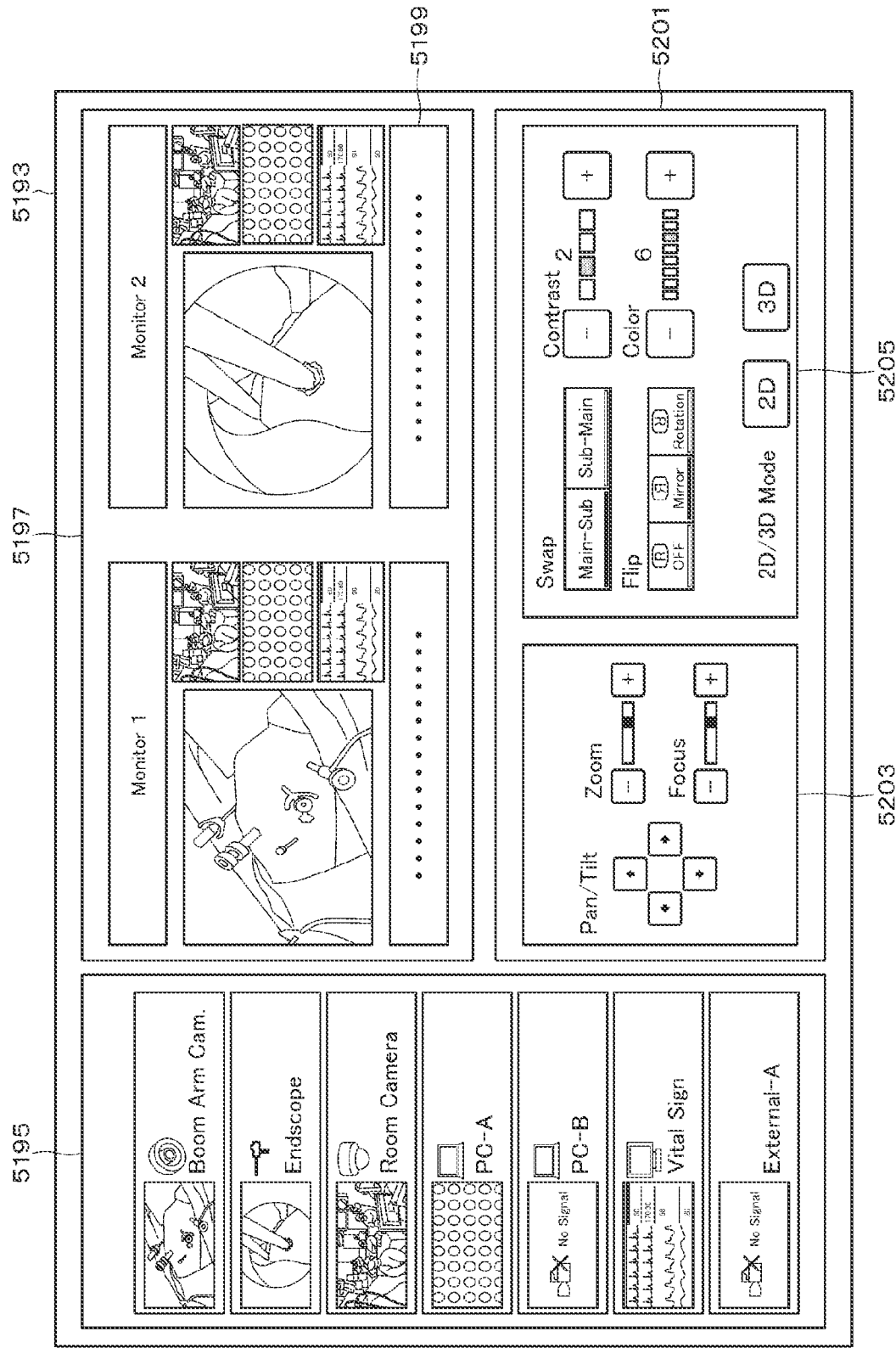
FIG. 13 is a diagram illustrating a display example of an operation screen on a centralized operation panel.

FIG. 13 is a diagram illustrating a display example of an operation screen on the centralized operation panel 5111.

FIG. 13 illustrates, as an example, an operation screen corresponding to a case where two display devices are provided in the operating room system 5100 as the devices at the output destination. Referring to FIG. 13, an operation screen 5193 is provided with a transmission source selection area 5195, a preview area 5197, and a control area 5201.

The transmission source selection area 5195 displays a transmission source device provided in the operating room system 5100 and a thumbnail screen representing the display information held by the transmission source device in association with each other. The user can select the display information to be displayed on the display device from any of the transmission source devices displayed in the transmission source selection area 5195.

The preview area 5197 displays a preview of screens displayed on two display devices (Monitor1 and Monitor2) that are the devices at the output destination. In the illustrated example, four images are displayed in PinP on one display device. The four images correspond to the display information transmitted from the transmission source device selected in the transmission source selection area 5195. One of the four images is displayed relatively large as a main image, and the remaining three images are displayed relatively small as sub-images. The user can switch the main image and a sub-image by appropriately selecting areas where the four images are displayed. Furthermore, a status display area 5199 is provided below the areas where the four images are displayed, and the status regarding the surgical operation (for example, an elapsed time of the surgical operation, the patient's physical information, and the like) is appropriately displayed in the area.

The control area 5201 is provided with a transmission source operation area 5203 in which a graphical user interface (GUI) component for operating the device at the transmission source is displayed, and an output destination operation area 5205 in which a GUI component for operating the device at the output destination is displayed. In the illustrated example, the transmission source operation area 5203 is provided with GUI components for performing various operations (pan, tilt, and zoom) of the camera in the device at the transmission source having an imaging function. The user can operate the operation of the camera in the device at the transmission source by appropriately selecting these GUI components. Note that, although illustration is omitted, in a case where the device at the transmission source selected in the transmission source selection area 5195 is a recorder (in other words, in a case where the image recorded in the past in the recorder is displayed in the preview area 5197), the transmission source operation area 5203 can be provided with GUI components for performing operations such as reproduction, stop of reproduction, rewind, and fast forward, of the image.

Furthermore, the output destination operation area 5205 is provided with GUI components for performing various operations (swap, flip, color adjustment, contrast adjustment, and switching between 2D display and 3D display) for the display in the display device that is the device at the output destination. The user can operate the display in the display device by appropriately selecting these GUI components.

Note that the operation screen displayed on the centralized operation panel 5111 is not limited to the illustrated example, and the user may be able to perform operation input to devices that can be controlled by the audiovisual controller 5107 and the operating room control device 5109 provided in the operating room system 5100, via the centralized operation panel 5111.

Figure 14:
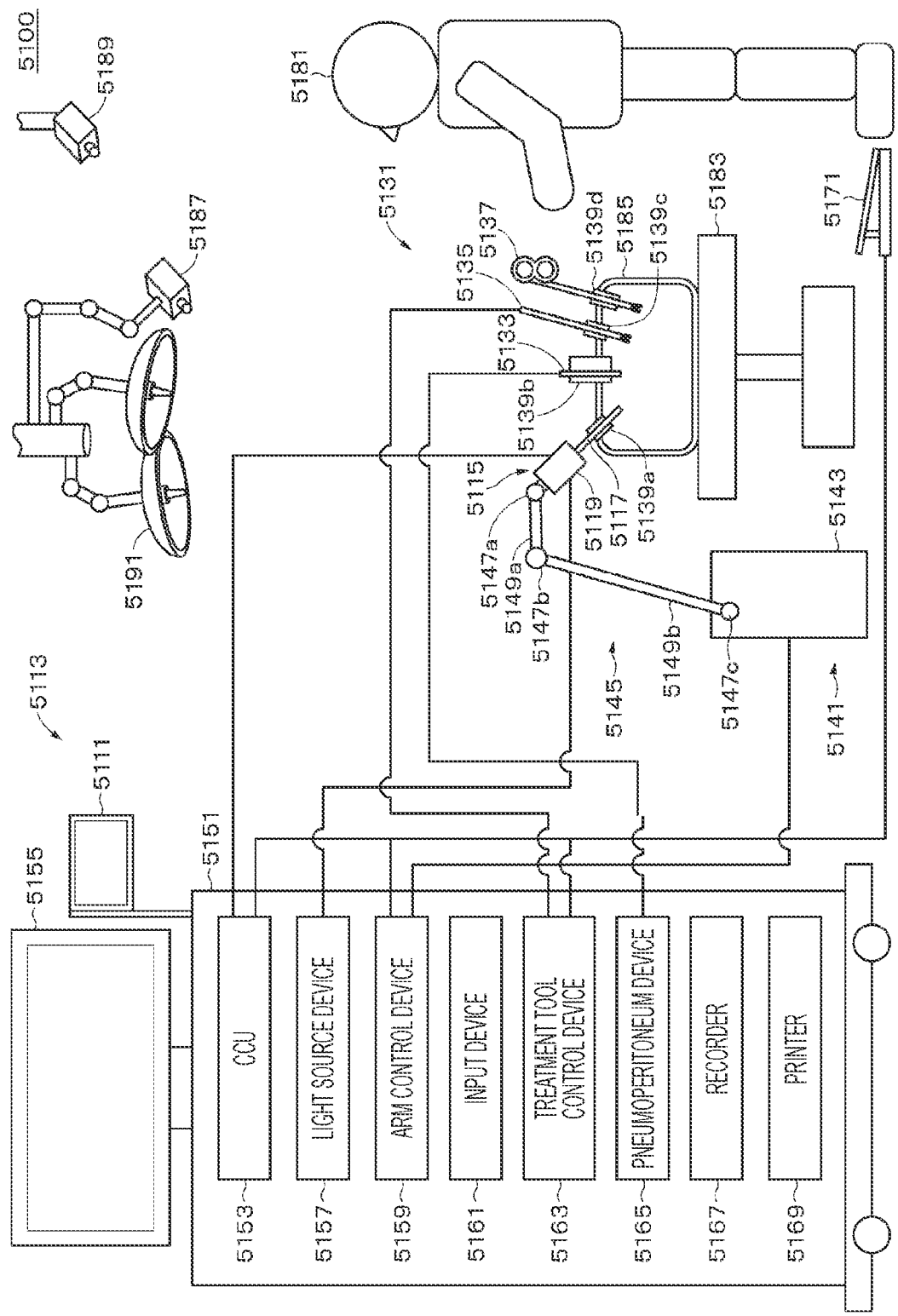
FIG. 14 is a diagram illustrating an example of a state of a surgical operation to which the operating room system is applied.

FIG. 14 is a diagram illustrating an example of a state of a surgical operation to which the above-described operating room system is applied. The ceiling camera 5187 and the surgical field camera 5189 are provided on the ceiling of the operating room and can image the hand of an operator (surgeon) 5181 who performs treatment for an affected part of a patient 5185 on the patient bed 5183 and the state of the entire operating room. The ceiling camera 5187 and the surgical field camera 5189 can be provided with a magnification adjustment function, a focal length adjustment function, an imaging direction adjustment function, and the like. The illumination 5191 is provided on the ceiling of the operating room and illuminates at least the hand of an operator 5181. The illumination 5191 may be able to appropriately adjust an irradiation light amount, a wavelength (color) of irradiation light, an irradiation direction of the light, and the like.

The endoscopic surgical system 5113, the patient bed 5183, the ceiling camera 5187, the surgical field camera 5189, and the illumination 5191 are connected in cooperation with each other via the audiovisual controller 5107 and the operating room control device 5109 (not illustrated in FIG. 14), as illustrated in FIG. 12. The centralized operation panel 5111 is provided in the operating room, and as described above, the user can appropriately operate these devices present in the operating room via the centralized operation panel 5111.

Hereinafter, a configuration of the endoscopic surgical system 5113 will be described in detail. As illustrated, the endoscopic surgical system 5113 includes an endoscope 5115, other surgical tools 5131, a support arm device 5141 that supports the endoscope 5115, and a cart 5151 in which various devices for endoscopic surgery are mounted.

In endoscopic surgery, a plurality of cylindrical puncture devices called trocars 5139a to 5139d is punctured into an abdominal wall instead of cutting the abdominal wall to open the abdomen. Then, a lens barrel 5117 of the endoscope 5115 and other surgical tools 5131 are inserted into a body cavity of the patient 5185 through the trocars 5139a to 5139d. In the illustrated example, as the other surgical tools 5131, a pneumoperitoneum tube 5133, an energy treatment tool 5135, and a pair of forceps 5137 are inserted into the body cavity of the patient 5185. Furthermore, the energy treatment tool 5135 is a treatment tool for performing incision and detachment of tissue, sealing of a blood vessel, and the like with a high-frequency current or an ultrasonic vibration. Note that the illustrated surgical tools 5131 are mere examples, and various kinds of surgical tools typically used in the endoscopic surgery such as tweezers, a retractor, and the like may be used as the surgical tools 5131.

An image of an operation site in the body cavity of the patient 5185 imaged by the endoscope 5115 is displayed on a display device 5155. The operator 5181 performs treatment such as removal of an affected part, using the energy treatment tool 5135 and the forceps 5137 while viewing the image of the operation site displayed on the display device 5155 in real time. Note that, although illustration is omitted, the pneumoperitoneum tube 5133, the energy treatment tool 5135, and the forceps 5137 are supported by the operator 5181, an assistant, or the like during the surgical operation.

(Support Arm Device)

The support arm device 5141 includes an arm unit 5145 extending from a base unit 5143. In the illustrated example, the arm unit 5145 includes joint portions 5147a, 5147b, and 5147c, and links 5149a and 5149b, and is driven under the control of an arm control device 5159. The endoscope 5115 is supported by the arm unit 5145, and the position and posture of the endoscope 5115 are controlled. With the control, stable fixation of the position of the endoscope 5115 can be realized.

(Endoscope)

The endoscope 5115 includes the lens barrel 5117 having a region with a predetermined length from a distal end inserted into the body cavity of the patient 5185, and a camera head 5119 connected to a proximal end of the lens barrel 5117. In the illustrated example, the endoscope 5115 configured as a so-called hard endoscope including the hard lens barrel 5117 is illustrated. However, the endoscope 5115 may be configured as a so-called soft endoscope including the soft lens barrel 5117.

The distal end of the lens barrel 5117 is provided with an opening in which an object lens is fit. A light source device 5157 is connected to the endoscope 5115, and light generated by the light source device 5157 is guided to the distal end of the lens barrel by a light guide extending inside the lens barrel 5117 and an object to be observed in the body cavity of the patient 5185 is irradiated with the light through the object lens. Note that the endoscope 5115 may be a forward-viewing endoscope, may be an oblique-viewing endoscope, or may be a side-viewing endoscope.

An optical system and an imaging element are provided inside the camera head 5119, and reflected light (observation light) from the object to be observed is condensed to the imaging element by the optical system. The observation light is photoelectrically converted by the imaging element, and an electrical signal corresponding to the observation light, that is, an image signal corresponding to an observed image is generated. The image signal is transmitted to a camera control unit (CCU) 5153 as raw data. Note that the camera head 5119 has a function to adjust magnification and a focal length by appropriately driving the optical system.

Note that, for example, to cope with stereoscopic view (3D display) or the like, a plurality of imaging elements may be provided in the camera head 5119. In this case, a plurality of relay optical systems is provided inside the lens barrel 5117 to guide the observation light to each of the plurality of imaging elements.

(Various Devices Mounted in Cart)

The CCU 5153 includes a central processing unit (CPU), a graphics processing unit (GPU), and the like, and centrally controls the operations of the endoscope 5115 and the display device 5155. Specifically, the CCU 5153 applies various types of image processing for displaying an image based on the image signal, such as developing processing (demosaic processing), to the image signal received from the camera head 5119. The CCU 5153 provides the image signal to which the image processing has been applied to the display device 5155.

Furthermore, the audiovisual controller 5107 illustrated in FIG. 12 is connected to the CCU 5153. The CCU 5153 also supplies the image signal to which the image processing has been applied to the audiovisual controller 5107. Furthermore, the CCU 5153 transmits a control signal to the camera head 5119 to control its driving. The control signal may include information regarding imaging conditions such as the magnification and focal length. The information regarding imaging conditions may be input via an input device 5161 or may be input via the above-described centralized operation panel 5111.

The display device 5155 displays the image based on the image signal to which the image processing has been applied by the CCU 5153 under the control of the CCU 5153. In a case where the endoscope 5115 supports high-resolution imaging such as 4K (horizontal pixel number 3840×vertical pixel number 2160) or 8K (horizontal pixel number 7680× vertical pixel number 4320) and/or in a case where the endoscope 5115 supports 3D display, for example, the display device 5155, which can perform high-resolution display and/or 3D display, can be used corresponding to each case. In the case where the endoscope 5115 supports the high-resolution imaging such as 4K or 8K, a greater sense of immersion can be obtained by use of the display device 5155 with the size of 55 inches or more. Furthermore, a plurality of display devices 5155 having different resolutions and sizes may be provided depending on the use.

The light source device 5157 includes a light source such as a light emitting diode (LED), for example, and supplies irradiation light to the endoscope 5115 in imaging an operation site.

The arm control device 5159 includes a processor such as a CPU, and operates according to a predetermined program, thereby controlling driving of the arm unit 5145 of the support arm device 5141 according to a predetermined control method.

The input device 5161 is an input interface for the endoscopic surgical system 5113. The user can input various types of information and instructions to the endoscopic surgical system 5113 via the input device 5161. For example, the user inputs various types of information regarding the surgical operation, such as the patient's physical information and the information regarding an operation method of the surgical operation via the input device 5161. Furthermore, for example, the user inputs an instruction to drive the arm unit 5145, an instruction to change the imaging conditions (such as the type of the irradiation light, the magnification, and the focal length) of the endoscope 5115, an instruction to drive the energy treatment tool 5135, or the like via the input device 5161.

The type of the input device 5161 is not limited, and the input device 5161 may be one of various known input devices. For example, a mouse, a keyboard, a touch panel, a switch, a foot switch 5171, a lever, and/or the like can be applied to the input device 5161. In the case where a touch panel is used as the input device 5161, the touch panel may be provided on a display surface of the display device 5155.

Alternatively, the input device 5161 is, for example, a device worn by the user, such as a glass-type wearable device or a head mounted display (HMD), and various inputs are performed according to a gesture or a line-of-sight of the user detected by the device.

Furthermore, the input device 5161 includes a camera capable of detecting a movement of the user, and various inputs are performed according to a gesture or a line-of-sight of the user detected from an image imaged by the camera. Moreover, the input device 5161 includes a microphone capable of collecting a voice of the user, and various inputs are performed by a sound through the microphone. The input device 5161 is configured to be able to input various types of information in a non-contact manner, as described above, so that the user (for example, the operator 5181) in particular belonging to a clean area can operate a device belonging to a filthy area in a non-contact manner. Furthermore, since the user can operate the device without releasing his/her hand from the possessed surgical tool, the user's convenience is improved.

A treatment tool control device 5163 controls driving of the energy treatment tool 5135 for cauterization and incision of tissue, sealing of a blood vessel, and the like. A pneumoperitoneum device 5165 sends a gas into the body cavity of the patient 5185 through the pneumoperitoneum tube 5133 to expand the body cavity for the purpose of securing a field of vision by the endoscope 5115 and a work space for the operator. A recorder 5167 is a device that can record various types of information regarding the surgical operation. A printer 5169 is a device that can print the various types of information regarding the surgery in various formats such as a text, an image, or a graph.

Hereinafter, a particularly characteristic configuration in the endoscopic surgical system 5113 will be further described in detail.

(Support Arm Device)

The support arm device 5141 includes the base unit 5143 as a base and the arm unit 5145 extending from the base unit 5143. In the illustrated example, the arm unit 5145 includes the plurality of joint portions 5147a, 5147b, and 5147c, and the plurality of links 5149a and 5149b connected by the joint portion 5147b. However, FIG. 14 illustrates a simplified configuration of the arm unit 5145 for simplification. In reality, the shapes, the number, and the arrangement of the joint portions 5147a to 5147c and the links 5149a and 5149b, directions of rotation axes of the joint portions 5147a to 5147c, and the like can be appropriately set so that the arm unit 5145 has a desired degree of freedom. For example, the arm unit 5145 can favorably have six degrees of freedom or more. With the configuration, the endoscope 5115 can be freely moved within a movable range of the arm unit 5145. Therefore, the lens barrel 5117 of the endoscope 5115 can be inserted from a desired direction into the body cavity of the patient 5185.

Actuators are provided in the joint portions 5147a to 5147c, and the joint portions 5147a to 5147c are configured to be rotatable around predetermined rotation axes by driving of the actuators. The driving of the actuators is controlled by the arm control device 5159, so that rotation angles of the joint portions 5147a to 5147c are controlled and driving of the arm unit 5145 is controlled. With the control, control of the position and posture of the endoscope 5115 can be realized. At this time, the arm control device 5159 can control the driving of the arm unit 5145 by various known control methods such as force control or position control.

For example, by the operator 5181 appropriately performing an operation input via the input device 5161 (including a foot switch 5171), the driving of the arm unit 5145 may be appropriately controlled by the arm control device 5159 according to the operation input, and the position and posture of the endoscope 5115 may be controlled. With the control, the endoscope 5115 at the distal end of the arm unit 5145 can be moved from an arbitrary position to an arbitrary position, and then can be fixedly supported at the position after the movement. Note that the arm unit 5145 may be operated by a so-called master-slave system. In this case, the arm unit 5145 can be remotely operated by the user via the input device 5161 installed at a place distant from the operating room.

Furthermore, in a case where the force control is applied, the arm control device 5159 receives external force from the user, and may perform so-called power assist control to drive the actuators of the joint portions 5147a to 5147c so that the arm unit 5145 can smoothly move according to the external force. With the control, the user can move the arm unit 5145 with relatively light force when moving the arm unit 5145 while being in direct contact with the arm unit 5145.

Accordingly, the user can more intuitively move the endoscope 5115 with a simpler operation, and the user's convenience can be improved.

Here, in the endoscopic surgery, the endoscope 5115 has been generally supported by a doctor called scopist. In contrast, by use of the support arm device 5141, the position of the endoscope 5115 can be reliably fixed without manual operation, and thus an image of the operation site can be stably obtained and the surgical operation can be smoothly performed.

Note that the arm control device 5159 is not necessarily provided in the cart 5151. Furthermore, the arm control device 5159 is not necessarily one device. For example, the arm control device 5159 may be provided in each of the joint portions 5147a to 5147c of the arm unit 5145 of the support arm device 5141, and the drive control of the arm unit 5145 may be realized by mutual cooperation of the plurality of arm control devices 5159.

(Light Source Device)

The light source device 5157 supplies irradiation light, which is used in imaging the operation site, to the endoscope 5115. The light source device 5157 includes, for example, an LED, a laser light source, or a white light source configured by a combination of the laser light sources. In a case where the white light source is configured by a combination of RGB laser light sources, output intensity and output timing of the respective colors (wavelengths) can be controlled with high accuracy. Therefore, white balance of a captured image can be adjusted in the light source device 5157. Furthermore, in this case, the object to be observed is irradiated with the laser light from each of the RGB laser light sources in a time division manner, and the driving of the imaging element of the camera head 5119 is controlled in synchronization with the irradiation timing, so that images each corresponding to RGB can be imaged in a time division manner. According to the method, a color image can be obtained without providing a color filter to the imaging element.

Further, driving of the light source device 5157 may be controlled to change intensity of light to be output every predetermined time. The driving of the imaging element of the camera head 5119 is controlled in synchronization with change timing of the intensity of light, and images are acquired in a time division manner and are synthesized, so that a high-dynamic range image without clipped blacks and flared highlights can be generated.

Furthermore, the light source device 5157 may be configured to be able to supply light in a predetermined wavelength band corresponding to special light observation. In the special light observation, for example, so-called narrow band imaging is performed by radiating light in a narrower band than the irradiation light (that is, white light) at the time of normal observation, using wavelength dependence of absorption of light in a body tissue, to image a predetermined tissue such as a blood vessel in a mucosal surface layer at high contrast. Alternatively, in the special light observation, fluorescence observation to obtain an image by fluorescence generated by radiation of exciting light may be performed. In the fluorescence observation, irradiating the body tissue with exciting light to observe fluorescence from the body tissue (self-fluorescence observation), injecting a reagent such as indocyanine green (ICG) into the body tissue and irradiating the body tissue with exciting light corresponding to a fluorescence wavelength of the reagent to obtain a fluorescence image, or the like can be performed. The light source device 5157 may be configured to be able to supply narrow-band light and/or exciting light corresponding to such special light observation.

(Camera Head and CCU)

Figure 15:
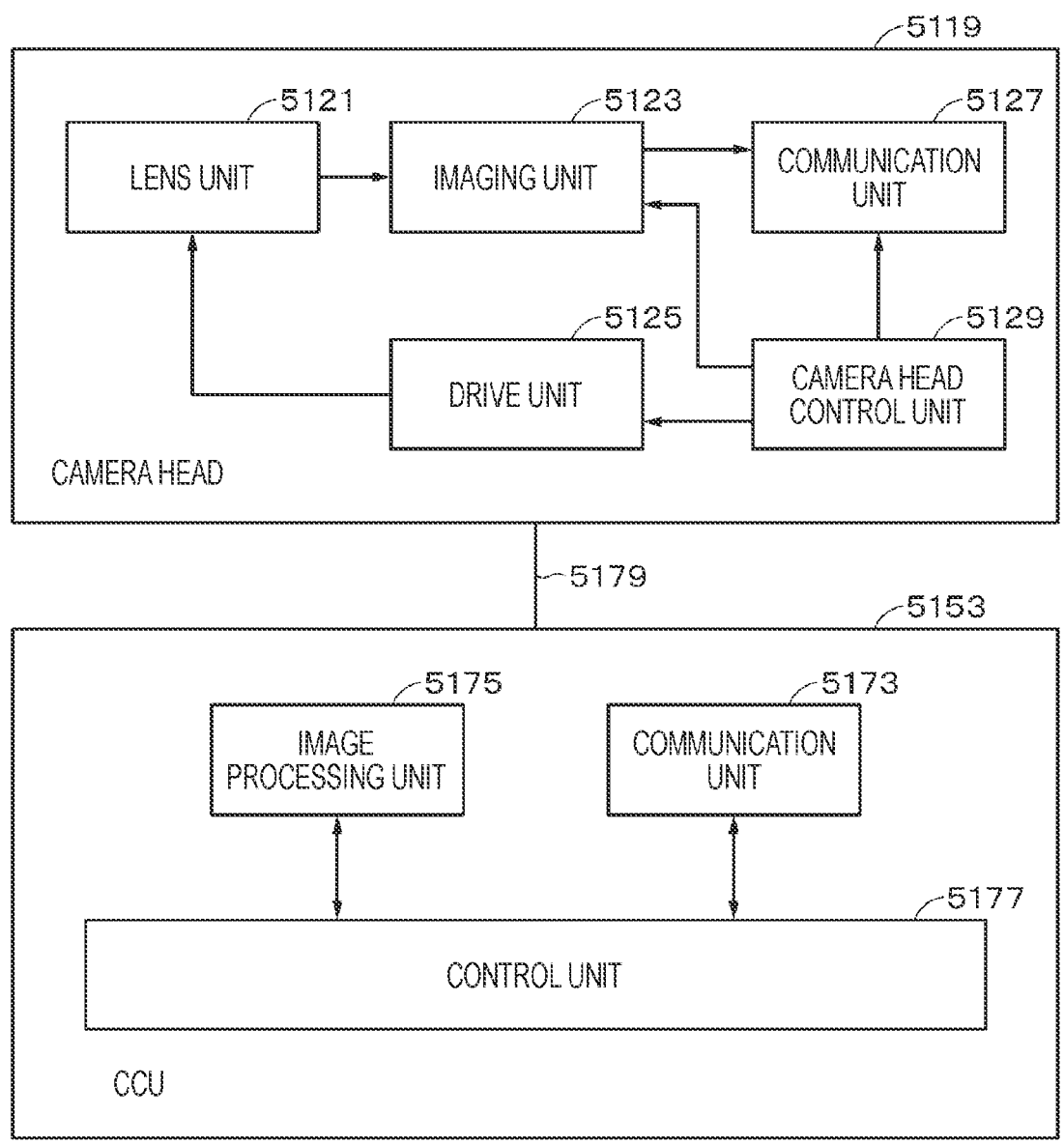
FIG. 15 is a block diagram illustrating an example of functional configurations of a camera head and a CCU illustrated in FIG. 14.

Functions of the camera head 5119 and the CCU 5153 of the endoscope 5115 will be described in more detail with reference to FIG. 15. FIG. 15 is a block diagram illustrating an example of functional configurations of the camera head 5119 and the CCU 5153 illustrated in FIG. 14.

Referring to FIG. 15, the camera head 5119 has a lens unit 5121, an imaging unit 5123, a drive unit 5125, a communication unit 5127, and a camera head control unit 5129 as its functions. Furthermore, the CCU 5153 includes a communication unit 5173, an image processing unit 5175, and a control unit 5177 as its functions. The camera head 5119 and the CCU 5153 are communicatively connected with each other by a transmission cable 5179.

First, a functional configuration of the camera head 5119 will be described. The lens unit 5121 is an optical system provided in a connection portion between the lens unit 5121 and the lens barrel 5117. Observation light taken through the distal end of the lens barrel 5117 is guided to the camera head 5119 and enters the lens unit 5121. The lens unit 5121 is configured by a combination of a plurality of lenses including a zoom lens and a focus lens. Optical characteristics of the lens unit 5121 are adjusted to condense the observation light on a light receiving surface of the imaging element of the imaging unit 5123. Furthermore, the zoom lens and the focus lens have their positions on the optical axis movable for adjustment of the magnification and focal point of the captured image.

The imaging unit 5123 includes the imaging element, and is disposed at a rear stage of the lens unit 5121. The observation light having passed through the lens unit 5121 is focused on the light receiving surface of the imaging element, and an image signal corresponding to the observed image is generated by photoelectric conversion. The image signal generated by the imaging unit 5123 is provided to the communication unit 5127.

As the imaging element configuring the imaging unit 5123, for example, a complementary metal oxide semiconductor (CMOS)-type imaging element having Bayer arrangement and capable of color imaging is used. Note that, as the imaging element, for example, an imaging element that can image a high-resolution image of 4K or more may be used. By obtainment of the image of the operation site with high resolution, the operator 5181 can grasp the state of the operation site in more detail and can more smoothly advance the surgical operation.

Furthermore, the imaging element configuring the imaging unit 5123 includes a pair of imaging elements for respectively obtaining image signals for right eye and for left eye corresponding to 3D display. With the 3D display, the operator 5181 can more accurately grasp the depth of biological tissue in the operation site. Note that, in a case where the imaging unit 5123 is configured by multiple imaging elements, a plurality of systems of the lens units 5121 may be provided corresponding to the imaging elements.

Furthermore, the imaging unit 5123 is not necessarily provided in the camera head 5119. For example, the imaging unit 5123 may be provided immediately after the object lens inside the lens barrel 5117.

The drive unit 5125 includes an actuator, and moves the zoom lens and the focus lens of the lens unit 5121 by a predetermined distance along the optical axis under the control of the camera head control unit 5129. With the movement, the magnification and focal point of the captured image by the imaging unit 5123 can be appropriately adjusted.

The communication unit 5127 includes a communication device for transmitting or receiving various types of information to or from the CCU 5153. The communication unit 5127 transmits the image signal obtained from the imaging unit 5123 to the CCU 5153 through the transmission cable 5179 as raw data. At this time, to display the captured image of the operation site with low latency, the image signal is favorably transmitted by optical communication. This is because, in the surgical operation, the operator 5181 performs the surgical operation while observing a state of an affected part with the captured image, and thus display of a moving image of the operation site in as real time as possible is demanded for a safer and more reliable surgical operation. In the case of the optical communication, the communication unit 5127 is provided with a photoelectric conversion module that converts an electrical signal into an optical signal. The image signal is converted into the optical signal by the photoelectric conversion module and is then transmitted to the CCU 5153 via the transmission cable 5179.

Furthermore, the communication unit 5127 receives a control signal for controlling driving of the camera head 5119 from the CCU 5153. The control signal includes information regarding the imaging conditions such as information for specifying a frame rate of the captured image, information for specifying an exposure value at the time of imaging, and/or information for specifying the magnification and the focal point of the captured image, for example. The communication unit 5127 provides the received control signal to the camera head control unit 5129. Note that the control signal from the CCU 5153 may also be transmitted by the optical communication. In this case, the communication unit 5127 is provided with a photoelectric conversion module that converts an optical signal into an electrical signal, and the control signal is converted into an electrical signal by the photoelectric conversion module and is then provided to the camera head control unit 5129.

Note that the imaging conditions such as the frame rate, exposure value, magnification, and focal point are automatically set by the control unit 5177 of the CCU 5153 on the basis of the acquired image signal. That is, so-called an auto exposure (AE) function, an auto focus (AF) function, and an auto white balance (AWB) function are incorporated in the endoscope 5115.

The camera head control unit 5129 controls the driving of the camera head 5119 on the basis of the control signal received from the CCU 5153 via the communication unit 5127. For example, the camera head control unit 5129 controls driving of the imaging element of the imaging unit 5123 on the basis of the information for specifying the frame rate of the captured image and/or the information for specifying exposure at the time of imaging. Furthermore, for example, the camera head control unit 5129 appropriately moves the zoom lens and the focus lens of the lens unit 5121 via the drive unit 5125 on the basis of the information for specifying the magnification and focal point of the captured image. The camera head control unit 5129 may further have a function to store information for identifying the lens barrel 5117 and the camera head 5119.

Note that the configuration of the lens unit 5121, the imaging unit 5123, and the like is arranged in a hermetically sealed structure having high airtightness and waterproofness, so that the camera head 5119 can have resistance to autoclave sterilization processing.

Next, a functional configuration of the CCU 5153 will be described. The communication unit 5173 includes a communication device for transmitting or receiving various types of information to or from the camera head 5119. The communication unit 5173 receives the image signal transmitted from the camera head 5119 through the transmission cable 5179. At this time, as described above, the image signal can be favorably transmitted by the optical communication. In this case, the communication unit 5173 is provided with a photoelectric conversion module that converts an optical signal into an electrical signal, corresponding to the optical communication. The communication unit 5173 provides the image signal converted into the electrical signal to the image processing unit 5175.

Furthermore, the communication unit 5173 transmits the control signal for controlling driving of the camera head 5119 to the camera head 5119. The control signal may also be transmitted by the optical communication.

The image processing unit 5175 applies various types of image processing to the image signal as raw data transmitted from the camera head 5119. The image processing includes, for example, various types of known signal processing such as development processing, high image quality processing (such as band enhancement processing, super resolution processing, noise reduction (NR) processing, and/or camera shake correction processing), and/or enlargement processing (electronic zoom processing). Furthermore, the image processing unit 5175 performs wave detection processing for the image signal, for performing AE, AF, and AWB.

The image processing unit 5175 includes a processor such as a CPU or a GPU, and the processor operates according to a predetermined program, thereby performing the above-described image processing and wave detection processing. Note that in a case where the image processing unit 5175 includes a plurality of GPUs, the image processing unit 5175 appropriately divides the information regarding the image signal and performs the image processing in parallel by the plurality of GPUs.

The control unit 5177 performs various types of control related to imaging of the operation site by the endoscope 5115 and display of the captured image. For example, the control unit 5177 generates the control signal for controlling driving of the camera head 5119. At this time, in a case where the imaging conditions are input by the user, the control unit 5177 generates the control signal on the basis of the input by the user. Alternatively, in a case where the AE function, the AF function, and the AWB function are incorporated in the endoscope 5115, the control unit 5177 appropriately calculates optimum exposure value, focal length, and white balance according to a result of the wave detection processing by the image processing unit 5175, and generates the control signal.

Furthermore, the control unit 5177 displays the image of the operation portion or the like in the display device 5155 on the basis of the image signal to which the image processing has been applied by the image processing unit 5175. At this time, the control unit 5177 recognizes various objects in the image of the operation site, using various image recognition technologies. For example, the control unit 5177 can recognize a surgical instrument such as forceps, a specific living body portion, blood, mist at the time of use of the energy treatment tool 5135, or the like, by detecting a shape of an edge, a color, or the like of an object included in the captured image. The control unit 5177 superimposes and displays various types of surgery support information on the image of the operation site, in displaying the image of the operation site on the display device 5155, using the result of recognition. The surgery support information is superimposed, displayed, and presented to the operator 5181, so that the surgical operation can be more safely and reliably advanced.

The transmission cable 5179 that connects the camera head 5119 and the CCU 5153 is an electrical signal cable supporting communication of electrical signals, an optical fiber supporting optical communication, or a composite cable thereof.

Here, in the illustrated example, the communication has been performed in a wired manner using the transmission cable 5179. However, the communication between the camera head 5119 and the CCU 5153 may be wirelessly performed. In a case where the communication between the camera head 5119 and the CCU 5153 is wirelessly performed, it is not necessary to lay the transmission cable 5179 in the operating room.

Therefore, the situation in which movement of medical staffs in the operating room is hindered by the transmission cable 5179 can be eliminated.

An example of the operating room system 5100 to which the technology according to the present disclosure is applicable has been described. Note that, here, a case in which the medical system to which the operating room system 5100 is applied is the endoscopic surgical system 5113 has been described as an example. However, the configuration of the operating room system 5100 is not limited to the example. For example, the operating room system 5100 may be applied to a flexible endoscopic system for examination or a microsurgery system, instead of the endoscopic surgical system 5113.

The technology according to the present disclosure can be suitably applied to display the image of the entire affected part of the patient and the partial enlargement of the affected part in an enlarged manner among the above-described configurations. Specifically, the present technology is applied to the image capture in the imaging unit 5123, and a first image obtained by capturing the entire affected part and a second image that is a partially enlarged image of the affected part are displayed on one of two display devices (Monitor 1 and Monitor 2). As a result, the operator 5181 or the assistant can simultaneously check the entire affected part and the partial region of the affected part.

Furthermore, the present technology can be used not only for the surgical operation but also for diagnosis of a patient, remote medical care, or the like, using a video captured by a camera.

3. Application

The technology according to the present disclosure can be applied to various products. For example, the technology according to the present disclosure may be realized as a device mounted on any type of moving bodies including an automobile, an electric automobile, a hybrid electric automobile, an electric motorcycle, a bicycle, a personal mobility, an airplane, a drone, a ship, a robot, a construction machine, an agricultural machine (tractor), and the like.

Figure 16:
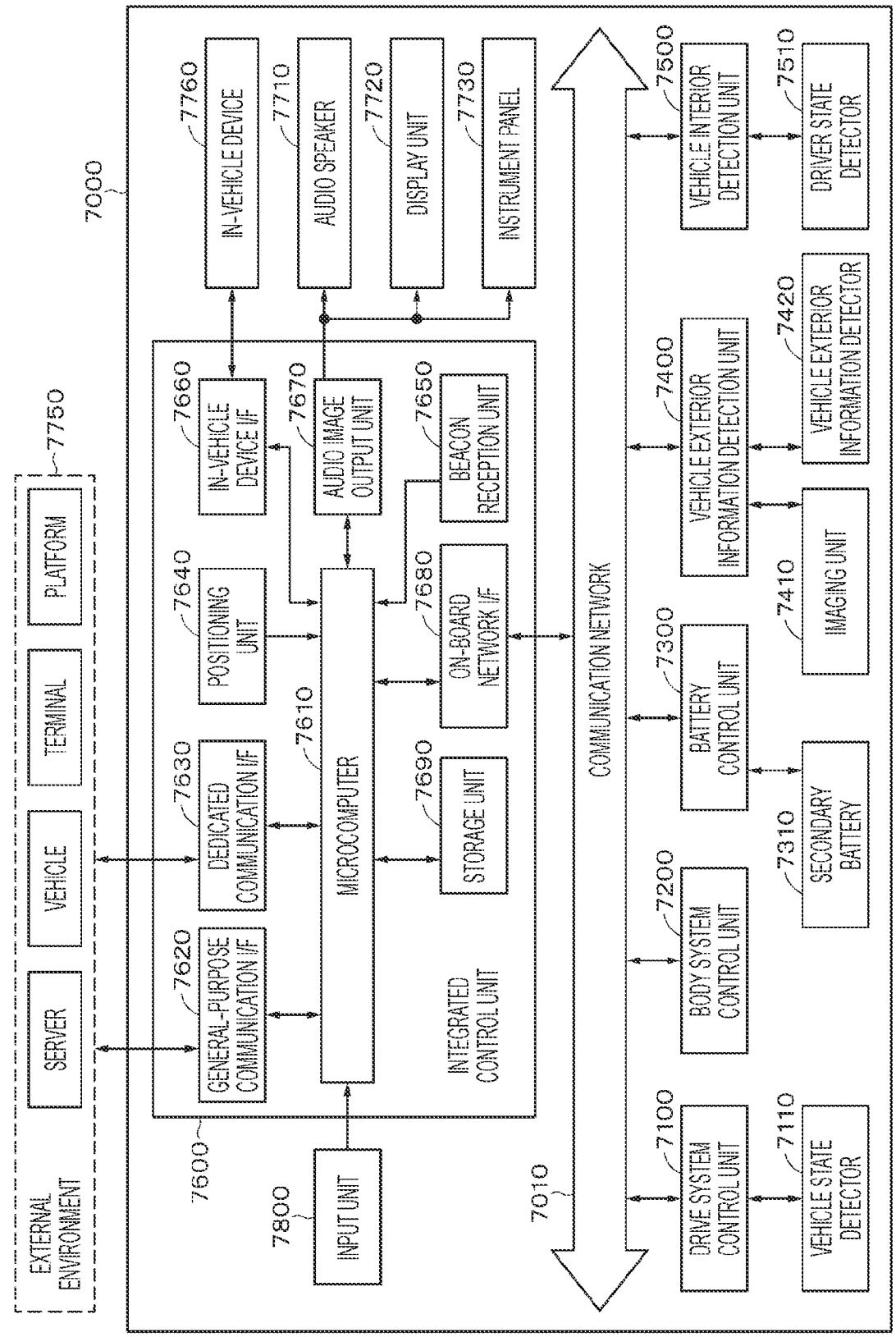
FIG. 16 is a block diagram illustrating an example of a schematic configuration of a vehicle control system.

FIG. 16 is a block diagram illustrating a schematic configuration example of a vehicle control system 7000 as an example of a moving body control system to which the technology according to the present disclosure is applicable. A vehicle control system 7000 includes a plurality of electronic control units connected through a communication network 7010. In the example illustrated in FIG. 16, the vehicle control system 7000 includes a drive system control unit 7100, a body system control unit 7200, a battery control unit 7300, a vehicle exterior information detection unit 7400, a vehicle interior information detection unit 7500, and an integration control unit 7600. The communication network 7010 that connects the plurality of control units may be, for example, an on-board communication network conforming to an arbitrary standard such as a controller area network (CAN), a local interconnect network (LIN), a local area network (LAN), or FlexRay (registered trademark).

Each control unit includes a microcomputer that performs arithmetic processing according to various programs, a storage unit that stores programs executed by the microcomputer, parameters used for various calculations, and the like, and a drive circuit that drives various devices to be controlled. Each control unit includes a network I/F for communicating with another control unit via the communication network 7010 and a communication I/F for communicating with a device, a sensor, or the like inside and outside the vehicle by wired communication or wireless communication. FIG. 16 illustrates, as functional configurations of the integration control unit 7600, a microcomputer 7610, a general-purpose communication I/F 7620, a dedicated communication I/F 7630, a positioning unit 7640, a beacon reception unit 7650, an in-vehicle device I/F 7660, an audio image output unit 7670, an on-board network I/F 7680, and a storage unit 7690. Similarly, the other control units include a microcomputer, a communication I/F, a storage unit, and the like.

The drive system control unit 7100 controls operations of devices regarding a drive system of a vehicle according to various programs. For example, the drive system control unit 7100 functions as a control device of a drive force generation device for generating drive force of a vehicle, such as an internal combustion engine or a drive motor, a drive force transmission mechanism for transmitting drive force to wheels, a steering mechanism that adjusts a steering angle of a vehicle, a braking device that generates braking force of a vehicle and the like. The drive system control unit 7100 may have a function as a control device of an antilock brake system (ABS), electronic stability control (ESC), or the like.

The drive system control unit 7100 is connected with a vehicle state detector 7110. The vehicle state detector 7110 includes, for example, at least one of a gyro sensor for detecting angular velocity of an axial rotational motion of a vehicle body, an acceleration sensor for detecting acceleration of the vehicle, or a sensor for detecting an operation amount of an accelerator pedal, an operation amount of a brake pedal, a steering angle of a steering wheel, an engine speed, rotation speed of a wheel, or the like. The drive system control unit 7100 performs arithmetic processing using a signal input from the vehicle state detector 7110 and controls the internal combustion engine, the drive motor, an electric power steering device, a brake device, or the like.

The body system control unit 7200 controls operations of various devices equipped in the vehicle body according to various programs. For example, the body system control unit 7200 functions as a control device of a keyless entry system, a smart key system, an automatic window device, and various lamps such as head lamps, back lamps, brake lamps, turn signals, and fog lamps. In this case, radio waves transmitted from a mobile device substituted for a key or signals of various switches can be input to the body system control unit 7200. The body system control unit 7200 receives an input of the radio waves or the signals, and controls a door lock device, the automatic window device, the lamps, and the like of the vehicle.

The battery control unit 7300 controls a secondary battery 7310 that is a power supply source of the drive motor according to various programs. For example, the battery control unit 7300 receives information such as a battery temperature, a battery output voltage, or a remaining capacity of the battery from a battery device including the secondary battery 7310. The battery control unit 7300 performs arithmetic processing using these signals to control temperature adjustment of the secondary battery 7310, a cooling device provided in the battery device, or the like.

The vehicle exterior information detection unit 7400 detects information outside the vehicle that mounts the vehicle control system 7000. For example, at least one of an imaging unit 7410 or a vehicle exterior information detector 7420 is connected to the vehicle exterior information detection unit 7400. The imaging unit 7410 includes at least one of a time of flight (ToF) camera, a stereo camera, a monocular camera, an infrared camera, or another camera. The vehicle exterior information detector 7420 includes, for example, at least one of an environmental sensor for detecting current weather or atmospheric phenomena or an ambient information detection sensor for detecting other vehicles, obstacles, pedestrians, and the like around the vehicle equipped with the vehicle control system 7000.

The environmental sensor may be, for example, at least one of a raindrop sensor for detecting rainy weather, a fog sensor for detecting fog, a sunshine sensor for detecting the degree of sunshine, or a snow sensor for detecting snowfall. The ambient information detection sensor may be at least one of an ultrasonic sensor, a radar device, or a light detection and ranging or laser imaging detection and ranging (LIDAR) device.

The imaging unit 7410 and the vehicle exterior information detector 7420 may be provided as independent sensors or devices, respectively, or may be provided as devices in which a plurality of sensors or devices is integrated.

Figure 17:
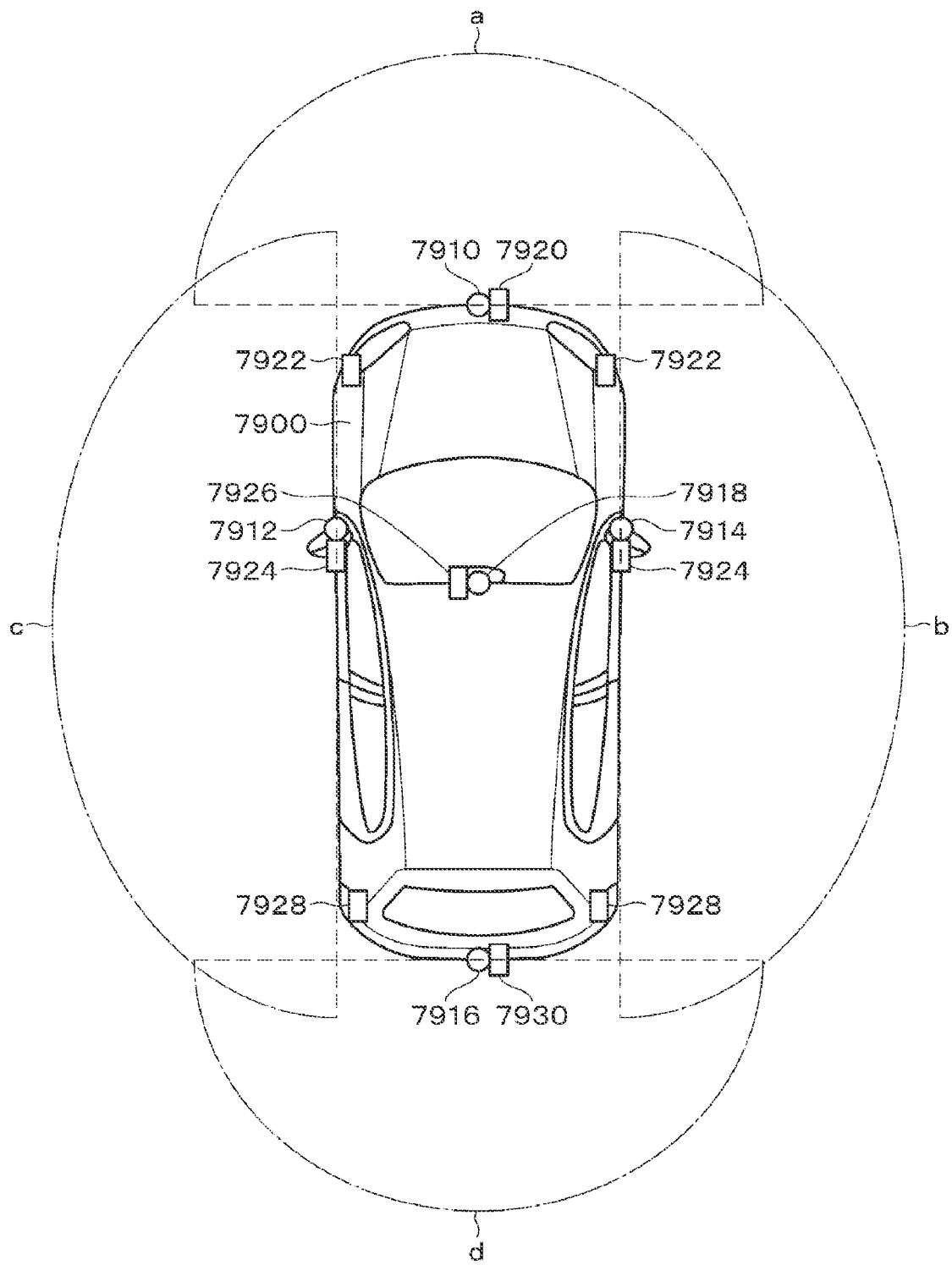
FIG. 17 is an explanatory diagram illustrating an example of installation positions of a vehicle exterior information detector and an imaging unit.

Here, FIG. 17 illustrates an example of installation positions of the imaging unit 7410 and the vehicle exterior information detector 7420. Each of imaging units 7910, 7912, 7914, 7916, and 7918 is provided on at least one position of a front nose, side mirrors, a rear bumper, a back door, or an upper portion of a windshield in an interior of a vehicle 7900, for example. The imaging unit 7910 provided at the front nose and the imaging unit 7918 provided at the upper portion of the windshield in an interior of the vehicle mainly acquire front images of the vehicle 7900. The imaging units 7912 and 7914 provided at the side mirrors mainly acquire side images of the vehicle 7900. The imaging unit 7916 provided at the rear bumper or the back door mainly acquires a rear image of the vehicle 7900. The imaging unit 7918 provided at the upper portion of the windshield in the interior of the vehicle is mainly used for detecting a preceding vehicle, a pedestrian, an obstacle, a traffic signal, a traffic sign, a lane, or the like.

Note that FIG. 17 illustrates an example of capture ranges of the imaging units 7910, 7912, 7914, and 7916. An imaging range a indicates an imaging range of the imaging unit 7910 provided at the front nose, imaging ranges b and c respectively indicate imaging ranges of the imaging units 7912 and 7914 provided at the side mirrors, and an imaging range d indicates an imaging range of the imaging unit 7916 provided at the rear bumper or the back door. For example, a bird's-eye view image of the vehicle 7900 as viewed from above can be obtained by superimposing image data imaged in the imaging units 7910, 7912, 7914, and 7916.

Vehicle exterior information detectors 7920, 7922, 7924, 7926, 7928, and 7930 provided at the front, rear, side, corner, and upper portion of the windshield in the interior of the vehicle 7900 may be ultrasonic sensors or radar devices, for example. Vehicle exterior information detectors 7920, 7926, and 7930 provided at the front nose, the rear bumper, the back door, and the upper portion of the windshield in the interior of the vehicle 7900 may be LIDAR devices, for example. These vehicle exterior information detectors 7920 to 7930 are mainly used for detecting a preceding vehicle, a pedestrian, an obstacle, and the like.

Referring back to FIG. 16, the description will be continued. The vehicle exterior information detection unit 7400 causes the imaging unit 7410 to image an image outside the vehicle, and receives the imaged image data. Furthermore, the vehicle exterior information detection unit 7400 receives detection information from the connected vehicle exterior information detector 7420. In a case where the vehicle exterior information detector 7420 is an ultrasonic sensor, a radar device, or an LIDAR device, the vehicle exterior information detection unit 7400 transmits ultrasonic waves, electromagnetic waves, or the like and receives information of received reflected waves. The vehicle exterior information detection unit 7400 may perform object detection processing or distance detection processing of persons, vehicles, obstacles, signs, letters or the like on a road surface on the basis of the received information. The vehicle exterior information detection unit 7400 may perform environment recognition processing of recognizing rainfall, fog, a road surface condition, or the like on the basis of the received information. The vehicle exterior information detection unit 7400 may calculate the distance to the object outside the vehicle on the basis of the received information.

Furthermore, the vehicle exterior information detection unit 7400 may perform image recognition processing or distance detection processing of recognizing persons, vehicles, obstacles, signs, letters, or the like on a road surface on the basis of the received image data. The vehicle exterior information detection unit 7400 may perform processing such as distortion correction or alignment for the received image data and combine the image data imaged by different imaging units 7410 to generate a bird's-eye view image or a panoramic image. The vehicle exterior information detection unit 7400 may perform viewpoint conversion processing using the image data imaged by the different imaging units 7410.

The vehicle interior information detection unit 7500 detects information inside the vehicle. A driver state detector 7510 that detects a state of a driver is connected to the vehicle interior information detection unit 7500, for example. The driver state detector 7510 may include a camera for imaging the driver, a biometric sensor for detecting biological information of the driver, a microphone for collecting sounds in the interior of the vehicle, and the like. The biometric sensor is provided, for example, on a seating surface, a steering wheel, or the like, and detects the biological information of an occupant sitting on a seat or the driver holding the steering wheel. The vehicle interior information detection unit 7500 may calculate the degree of fatigue or the degree of concentration of the driver or may determine whether or not the driver falls asleep at the wheel on the basis of detection information input from the driver state detector 7510. The vehicle interior information detection unit 7500 may perform processing such as noise canceling processing for collected sound signals.

The integration control unit 7600 controls the overall operation in the vehicle control system 7000 according to various programs. The integration control unit 7600 is connected with an input unit 7800. The input unit 7800 is realized by, a device that can be operated and input by an occupant, such as a touch panel, a button, a microphone, a switch, or a lever, for example. Data obtained by recognizing sounds input by the microphone may be input to the integration control unit 7600. The input unit 7800 may be, for example, a remote control device using an infrared ray or another radio wave, or may be an externally connected device such as a mobile phone or a personal digital assistant (PDA) corresponding to the operation of the vehicle control system 7000. The input unit 7800 may be, for example, a camera, and in this case, the occupant can input information by gesture. Alternatively, data obtained by detecting movement of a wearable device worn by the occupant may be input. Moreover, the input unit 7800 may include, for example, an input control circuit that generates an input signal on the basis of the information input by the occupant or the like using the above input unit 7800 and outputs the input signal to the integration control unit 7600, and the like. The occupant or the like inputs various data to and instructs the vehicle control system 7000 on a processing operation by operating the input unit 7800.

The storage unit 7690 may include a read only memory (ROM) for storing various programs executed by the microcomputer, and a random access memory (RAM) for storing various parameters, calculation results, sensor values, or the like. Furthermore, the storage unit 7690 may be realized by a magnetic storage device such as a hard disc drive (HDD), a semiconductor storage device, an optical storage device, a magneto-optical storage device, or the like.

The general-purpose communication I/F 7620 is a general-purpose communication I/F that mediates communication with various devices existing in an external environment 7750. The general-purpose communication I/F 7620 may include, for example, a cellular communication protocol such a global system of mobile communications (GSM), WiMAX, long term evolution (LTE), or LTE-advanced (LTE-A), or another wireless communication protocol such as a wireless LAN (also called Wi-Fi (registered trademark)) or Bluetooth (registered trademark). The general-purpose communication I/F 7620 may be connected to a device (for example, an application server or a control server) existing on an external network (for example, the Internet, a cloud network, or a company specific network) via a base station or an access point, for example. Furthermore, the general-purpose communication I/F 7620 may be connected with a terminal (for example, a terminal of a driver, a pedestrian, or a shop, or a machine type communication (MTC) terminal) existing in the vicinity of the vehicle, using a peer to peer (P2P) technology, for example.

The dedicated communication I/F 7630 is a communication I/F supporting a communication protocol formulated for use in the vehicle. For example, the dedicated communication I/F 7630 may include a standard protocol such as a wireless access in vehicle environment (WAVE), which is a combination of a lower layer IEEE 802.11p and an upper layer IEEE 1609, dedicated short range communications (DSRC), or a cellular communication protocol. The dedicated communication I/F 7630 typically performs V2X communication that is a concept including one or more of vehicle to vehicle communication, vehicle to infrastructure communication, vehicle to home communication, and vehicle to pedestrian communication.

The positioning unit 7640 receives a global navigation satellite system (GNSS) signal from a GNSS satellite (for example, a global positioning system (GPS) signal from a GPS satellite) to execute positioning, and generates position information including the latitude, longitude, and altitude of the vehicle, for example. Note that the positioning unit 7640 may specify a current position by exchanging signals with a wireless access point or may acquire the position information from a terminal such as a mobile phone, a PHS, or a smartphone having a positioning function.

The beacon reception unit 7650 receives, for example, a radio wave or an electromagnetic wave transmitted from a wireless station or the like installed on a road, and acquires information such as a current position, congestion, road closure, or required time. Note that the function of the beacon reception unit 7650 may be included in the above-described dedicated communication I/F 7630.

The in-vehicle device I/F 7660 is a communication interface that mediates connection between the microcomputer 7610 and various in-vehicle devices 7760 existing in the vehicle. The in-vehicle device I/F 7660 may establish wireless connection using a wireless communication protocol such as a wireless LAN, Bluetooth (registered trademark), near field communication (NFC), or wireless USB (WUSB). Furthermore, the in-vehicle device I/F 7660 may establish wired connection such as a universal serial bus (USB), a high-definition multimedia interface (HDMI), mobile high-definition link (MHL), or the like via a connection terminal (not illustrated) (and a cable if necessary). The in-vehicle device 7760 may include, for example, at least one of a mobile device or a wearable device possessed by an occupant or an information device carried in or attached to the vehicle. Furthermore, the in-vehicle device 7760 may include a navigation device that performs a route search to an arbitrary destination. The in-vehicle device I/F 7660 exchanges control signals or data signals with these in-vehicle devices 7760.

The on-board network I/F 7680 is an interface that mediates communication between the microcomputer 7610 and the communication network 7010. The on-board network I/F 7680 transmits and receives signals and the like according to a predetermined protocol supported by the communication network 7010.

The microcomputer 7610 of the integration control unit 7600 controls the vehicle control system 7000 according to various programs on the basis of information acquired via at least one of the general-purpose communication I/F 7620, the dedicated communication I/F 7630, the positioning unit 7640, the beacon reception unit 7650, the in-vehicle device I/F 7660, or the on-board network I/F 7680. For example, the microcomputer 7610 may calculate a control target value of the drive force generation device, the steering mechanism, or the brake device on the basis of the acquired information of the interior and the exterior of the vehicle, and output a control command to the drive system control unit 7100.

For example, the microcomputer 7610 may perform cooperative control for the purpose of realization of an advanced driver assistance system (ADAS) function including collision avoidance or shock mitigation of the vehicle, following travel based on an inter-vehicle distance, vehicle speed maintaining travel, collision warning of the vehicle, lane out warning of the vehicle, and the like. Furthermore, the microcomputer 7610 may control the drive force generation device, the steering mechanism, the braking device, or the like on the basis of the acquired information of a vicinity of the vehicle to perform cooperative control for the purpose of automatic driving of autonomous travel without depending on an operation of the driver or the like.

The microcomputer 7610 may create three-dimensional distance information between the vehicle and an object such as a peripheral structure or person and may create local map information including peripheral information of the current position of the vehicle on the basis of information acquired via at least one of the general-purpose communication I/F 7620, the dedicated communication I/F 7630, the positioning unit 7640, the beacon reception unit 7650, the in-vehicle device I/F 7660, or the on-board network I/F 7680. Furthermore, the microcomputer 7610 may predict danger such as a collision of the vehicle, approach of a pedestrian or the like, or entry into a closed road on the basis of the acquired information, and generate a warning signal. The warning signal may be, for example, a signal for generating a warning sound or for lighting a warning lamp.

The audio image output unit 7670 transmits an output signal of at least one of an audio or an image to an output device that can visually and aurally notify the occupant of the vehicle or outside the vehicle of information. In the example in FIG. 16, as the output device, an audio speaker 7710, a display unit 7720, and an instrument panel 7730 are exemplarily illustrated. The display unit 7720 may include, for example, at least one of an on-board display or a head-up display. The display unit 7720 may have an augmented reality (AR) display function. The output device may be a wearable device such as a headphone or a spectacular display worn by an occupant, a projector, a lamp, or the like other than the aforementioned devices. In the case where the output device is a display device, the display device visually displays a result obtained in various types of processing performed by the microcomputer 7610 or information received from another control unit, in various formats such as a text, an image, a table, and a graph. Furthermore, in the case where the output device is an audio output device, the audio output device converts an audio signal including reproduced audio data, acoustic data, or the like into an analog signal, and aurally outputs the analog signal.

Note that, in the example illustrated in FIG. 16, at least two control units connected via the communication network 7010 may be integrated as one control unit. Alternatively, an individual control unit may be configured by a plurality of control units. Moreover, the vehicle control system 7000 may include another control unit (not illustrated). Furthermore, in the above description, some or all of the functions carried out by any one of the control units may be performed by another control unit. That is, predetermined arithmetic processing may be performed by any of the control units as long as information is transmitted and received via the communication network 7010. Similarly, a sensor or a device connected to any of the control units may be connected to another control unit, and a plurality of control units may transmit and receive detection information to each other via the communication network 7010.

Note that a computer program for implementing the functions of the display control device 200 according to the present embodiment can be mounted in any of the control units or the like. Furthermore, a computer-readable recording medium in which such a computer program is stored can be provided. The recording medium is, for example, a magnetic disk, an optical disk, a magneto-optical disk, a flash memory, or the like. Furthermore, the above computer program may be delivered via, for example, a network without using a recording medium.

In the above-described vehicle control system 7000, the display control device 200 according to the present embodiment can be applied to the integration control unit 7600 of the application example illustrated in FIG. 16.

The imaging unit 7916 that captures the rear of the vehicle 7900 can output the first imaging signal and the second imaging signal in the all-pixel/thinning-out mode similarly to the imaging element 103 in the embodiment, and displays the first image based on the first imaging signal and the second image based on the second imaging signal on the display unit 7720. As a result, both the first image obtained by widely capturing the rear of the vehicle 7900 and the enlarged image of a partial region (for example, a bumper portion that may collide with a wall or the like in garaging)

of the first image can be displayed on the display unit 7720. As a result, the driver can drive while widely checking the rear of the vehicle 7900 and paying more attention so that the bumper portion or the like does not collide with the wall. Note that such display control by the display control device 200 can be performed not only for images captured by the imaging units on the rear of the vehicle 7900 but also on images captured by the imaging units provided on the front, right, and left.

4. Modification

The embodiments of the present technology have been specifically described. However, the present technology is not limited to the above-described embodiments, and various modifications based on the technical idea of the present technology can be made.

The present technology can be applied to not only a digital camera, a digital video camera, a single-lens reflex camera, or the like, but also applied to any device having a camera function, such as a smartphone, a tablet terminal, a portable game machine, or a glasses-type wearable device.

Furthermore, the present technology can also be applied to a so-called network camera in which a camera unit that captures an image/video and a display unit that displays a captured video are configured as separate housings and connected via a network. In a case where the camera unit transmits the first imaging signal and the second imaging signal to the display unit via the network, there is a possibility that a delay occurs between the first imaging signal and the second imaging signal. In this case, as described in the embodiment, the corresponding first imaging signal and second imaging signal may be synchronized on the basis of timing information.

Furthermore, imaging signals of all the pixels of the entire angle of view may be temporarily output from the imaging element 103, received by a reception unit or the like, divided into the first imaging signal and the second imaging signal, and supplied to the preprocessing unit 104.

Furthermore, the present technology can also be implemented by providing the imaging device 100 with an imaging element for first imaging signal output and an imaging element for second imaging signal output.

The present technology can also have the following configurations.

(1) A display control device including: a display control unit configured to control a display unit to output a first image based on a first imaging signal and a second image based on a second imaging signal, the first imaging signal and the second imaging signal being output from an imaging element that outputs the first imaging signal by pixel-thinning for an entire angle of view and outputs the second imaging signal in all of pixels for a partial region in the entire angle of view.

(2) The display control device according to (1), in which the first image and the second image are simultaneously displayed on the display unit.

(3) The display control device according to (1) or (2), in which the first image is an image representing an entire imaging range.

(4) The display control device according to any one of (1) to (3), in which the second image is a partially entire image of the imaging range.

(5) The display control device according to any one of (1) to (4), in which the first image and the second image are displayed side by side.

(6) The display control device according to any one of (1) to (5), in which the second image is superimposed and displayed on the first image.

(7) The display control device according to (6), in which the first image is displayed larger than the second image.

(8) The display control device according to any one of (1) to (7), in which the second image has higher image quality than the first image.

(9) The display control device according to any one of (1) to (8), in which the display control unit changes display modes of the first image and the second image according to a resolution of the display unit.

(10) The display control device according to (9), in which the first image and the second image are displayed side by side in a case where the resolution of the display unit is equal to or greater than a predetermined value.

(11) The display control device according to (9), in which the second image is superimposed and displayed on the first image in a case where the resolution of the display unit is equal to or less than a predetermined value.

(12) The display control device according to (11), in which the first image is displayed on the entire display unit.

(13) The display control device according to (11), in which the second image is displayed to be larger in size than the second image in a state of being displayed side by side with the first image.

(14) The display control device according to any one of (1) to (13), in which the display control unit changes a display position of the first image and/or a display position of the second image on the display unit according to an instruction from a user.

(15) The display control device according to any one of (1) to (14), in which the display control unit changes a size of the first image and/or a size of the second image on the display unit according to an instruction from a user.

(16) The display control device according to any one of (1) to (15), in which an icon representing a region corresponding to the second image in the first image is displayed on the first image on the display unit.

(17) A display control method including: controlling a display unit to output a first image based on a first imaging signal and a second image based on a second imaging signal, the first imaging signal and the second imaging signal being output from an imaging element that outputs the first imaging signal by pixel-thinning for an entire angle of view and outputs the second imaging signal in all of pixels for a partial region in the entire angle of view.

(18) A display control program for causing a computer to execute a display control method including: controlling a display unit to output a first image based on a first imaging signal and a second image based on a second imaging signal, the first imaging signal and the second imaging signal being output from an imaging element that outputs the first imaging signal by pixel-thinning for an entire angle of view and outputs the second imaging signal in all of pixels for a partial region in the entire angle of view.

REFERENCE SIGNS LIST

103 Imaging element
111 Display unit
200 Display control device
202 Display control unit

The invention claimed is:

1. A display control device comprising:
a display controller configured to control a display unit to output a first image based on a first imaging signal and a second image based on a second imaging signal, the first imaging signal and the second imaging signal being output from an imaging element that outputs the first imaging signal by pixel-thinning for an entire angle of view and outputs the second imaging signal in all of pixels for a partial region in the entire angle of view,
wherein the display controller changes display modes of the first image and the second image according to a resolution of the display unit, and
changing the display modes includes causing the first image and the second image to be displayed side by side in a case where the resolution of the display unit is equal to or greater than a predetermined value.

2. The display control device according to claim 1, wherein the first image and the second image are simultaneously displayed on the display unit.

3. The display control device according to claim 1, wherein the first image is an image representing an entire imaging range.

4. The display control device according to claim 1, wherein the second image is a partially entire image of the imaging range.

5. The display control device according to claim 1, wherein the first image is displayed larger than the second image.

6. The display control device according to claim 1, wherein the second image has higher image quality than the first image.

7. The display control device according to claim 1, wherein the second image is superimposed and displayed on the first image in a case where the resolution of the display unit is less than the predetermined value.

8. The display control device according to claim 7, wherein the first image is displayed on the entire display unit.

9. The display control device according to claim 7, wherein the second image is displayed to be larger in size than the second image in a state of being displayed side by side with the first image.

10. The display control device according to claim 1, wherein the display controller changes a display position of the first image and/or a display position of the second image on the display unit according to an instruction from a user.

11. The display control device according to claim 1, wherein the display controller changes a size of the first image and/or a size of the second image on the display unit according to an instruction from a user.

12. The display control device according to claim 1, wherein an icon representing a region corresponding to the second image in the first image is displayed on the first image on the display unit.

13. A display control method comprising:
controlling a display unit to output a first image based on a first imaging signal and a second image based on a second imaging signal, the first imaging signal and the second imaging signal being output from an imaging element that outputs the first imaging signal by pixel-thinning for an entire angle of view and outputs the second imaging signal in all of pixels for a partial region in the entire angle of view; and
changing display modes of the first image and the second image according to a resolution of the display unit, wherein
changing the display modes includes causing the first image and the second image to be displayed side by side in a case where the resolution of the display unit is equal to or greater than a predetermined value.

14. The display control method according to claim 13, wherein the second image is superimposed and displayed on the first image in a case where the resolution of the display unit is less than the predetermined value.

15. A non-transitory computer readable medium storing program, the program being executable by a computer to perform operations comprising:
controlling a display unit to output a first image based on a first imaging signal and a second image based on a second imaging signal, the first imaging signal and the second imaging signal being output from an imaging element that outputs the first imaging signal by pixel-thinning for an entire angle of view and outputs the second imaging signal in all of pixels for a partial region in the entire angle of view; and
changing display modes of the first image and the second image according to a resolution of the display unit, wherein
changing the display modes includes causing the first image and the second image to be displayed side by side in a case where the resolution of the display unit is equal to or greater than a predetermined value.

16. The non-transitory computer readable medium according to claim 15, wherein the second image is superimposed and displayed on the first image in a case where the resolution of the display unit is less than the predetermined value.

* * * * *